US008335828B2

(12) United States Patent
Saito

(10) Patent No.: US 8,335,828 B2
(45) Date of Patent: Dec. 18, 2012

(54) ACCESS BY DATA COMMUNICATION OF AN E-MAIL ADDRESSED TO STORAGE DEVICE

(75) Inventor: Shinsuke Saito, Aichi (JP)

(73) Assignee: Buffalo Inc., Nagoya-shi, Aichi-ken (JP)

( * ) Notice: Subject to any disclaimer, the term of this patent is extended or adjusted under 35 U.S.C. 154(b) by 506 days.

(21) Appl. No.: 12/506,244

(22) Filed: Jul. 20, 2009

(65) Prior Publication Data
US 2009/0276501 A1 Nov. 5, 2009

Related U.S. Application Data

(63) Continuation of application No. PCT/JP2008/050699, filed on Jan. 21, 2008.

(30) Foreign Application Priority Data

Jan. 23, 2007 (JP) .................. 2007-012469

(51) Int. Cl.
*G06F 15/16* (2006.01)
(52) U.S. Cl. ....................................... 709/206
(58) Field of Classification Search .................... 709/206
See application file for complete search history.

(56) References Cited

U.S. PATENT DOCUMENTS

| 2004/0044746 | A1* | 3/2004 | Matsusaka | ........ 709/217 |
| 2005/0091587 | A1* | 4/2005 | Ramarao et al. | ........ 715/522 |
| 2006/0195534 | A1* | 8/2006 | Isozaki et al. | ........ 709/206 |

FOREIGN PATENT DOCUMENTS

| JP | H08-083223 A | 3/1996 |
| JP | 2001-318912 A | 11/2001 |
| JP | 2005-157582 A | 6/2005 |
| JP | 2005-301809 A | 10/2005 |
| JP | 2006-041748 A | 2/2006 |

OTHER PUBLICATIONS

International Search Report for PCT/JP2008/050699 dated Feb. 26, 2008.
PCT Written Opinion of the International Searching Authority for PCT/JP2008/050699 dated Feb. 26, 2008.
Windows Server World dated Apr. 1, 2004, pp. 98 to 105.
Japanese Notice of the reason for refusal dated Dec. 22, 2010.
Chinese Office Action dated May 25, 2012.
English translation of Windows Server World dated Apr. 1, 2004, pp. 98 to 105.

* cited by examiner

*Primary Examiner* — George C Neurauter
(74) *Attorney, Agent, or Firm* — Yokoi & Co., U.S.A., Inc.; Toshiyuki Yokoi

(57) ABSTRACT

The present invention discloses a storage device connected through an internal network with an external network. The storage device includes a storage medium for storing files and an access unit for carrying out data communication of an e-mail with an attached file for accessing the storage medium with a terminal that is coupled with the external network. The access unit accepts access to the storage medium from the terminal by carrying out the data communication of the e-mail.

8 Claims, 26 Drawing Sheets

COMPARATIVE EXAMPLE

ACCESS BY DATA COMMUNICATION OF AN E-MAIL ADDRESSED TO STORAGE DEVICE

CROSS-REFERENCES TO RELATED APPLICATIONS

This Application is a CONTINUATION application claiming the benefit of priority of the co-pending International Patent Application No. PCT/JP2008/050699 with an international filing date of 21 Jan. 2008 that designated the United States, which claims the benefit of priority of Japanese Patent Application No. 2007-012469, filed Jan. 23, 2007, the entire disclosures of all Applications are expressly incorporated by reference in their entirety herein.

BACKGROUND OF THE INVENTION

1. Field of the Invention

The present invention relates to a storage device connected through an internal network to an external network, a storage system having the storage device, and the control thereof.

2. Description of Related Art

A protocol such as a Server Message Block (SMB) protocol is used to share files of Network Attached Storage (NAS) connected to a Local Area Network (LAN). In addition, a protocol such as a File Transfer Protocol (FTP) is used to transfer files from NAS to the Internet.

Japanese Patent Application Laid-open No. 2005-301809 describes uploading of data files from a data transfer device to an FTP server, and downloading of data files from the FTP server to a different data transfer device.

In the case a network address that is only valid on an LAN is imparted to an NAS, even if that NAS is attempted to be accessed from an external terminal connected to a different LAN or the Internet, that NAS cannot be accessed unless a network exchange is specially set. In addition, even if a firewall is provided between an LAN and the Internet, the NAS cannot be accessed from an external terminal unless a firewall is specially set.

BRIEF SUMMARY OF THE INVENTION

The present invention discloses to provide a storage medium of a storage device to be accessed from an external terminal without having to specially set a network exchange or firewall.

One aspect of the present invention provides a storage device, comprising:
  the storage device connected through an internal network with an external network;
  a storage medium for storing files;
  an access unit for carrying out data communication of an e-mail (electronic mail) with an attached file for accessing the storage medium with a terminal that is coupled with the external network; and
  the access unit accepting access to the storage medium from the terminal by carrying out the data communication of the e-mail.

Another aspect of the present invention provides a storage system, comprising:
  a storage device connected through an internal network with an external network;
  a terminal coupled with the external network;
  the storage device has a storage medium for storing files;
  the storage device has an access unit for carrying out data communication of an e-mail with an attached file for accessing the storage medium with the terminal through the external network;
  the access unit accepts access to the storage medium from the terminal by carrying out the data communication of the e-mail; and
  the terminal accesses the storage medium of the storage device by attaching a target file for accessing the storage medium of the storage device to an e-mail and carrying out data communication of the e-mail with the storage device through the external network.

Accessing the storage medium from the terminal includes reading out files from the storage medium, writing files to the storage medium, reading out the configuration of folders (also referred to as directories) from the storage medium, deleting files and folders from the storage medium and the like. Data communication of e-mails carried out by the storage device with the terminal includes both sending of e-mails to the terminal and receiving of e-mails from the terminal. Naturally, data communication of e-mails carried out by the terminals with the storage device includes both sending of e-mails to the storage device and receiving of e-mails from the storage device.

Furthermore, the present invention can also be applied to, for example, a control method having steps corresponding to the configuration of the device and system described above, a program for causing a computer to realize functions corresponding to the configuration of the device and system described above, a computer-readable recording medium on which the program is recorded, and a program product using the program.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purpose of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

FIG. 25 is an exemplary illustration of a drawing showing a display of an e-mail in the case of deleting all files and the like.

DETAILED DESCRIPTION OF THE INVENTION

The detailed description set forth below in connection with the appended drawings is intended as description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers.

The following provides an explanation of embodiments of the present invention in the order of (1) storage system configuration, (2) storage system operation and action, and (3) other variations.

(1) Configuration of Storage System Containing Storage Device

Figure 1:
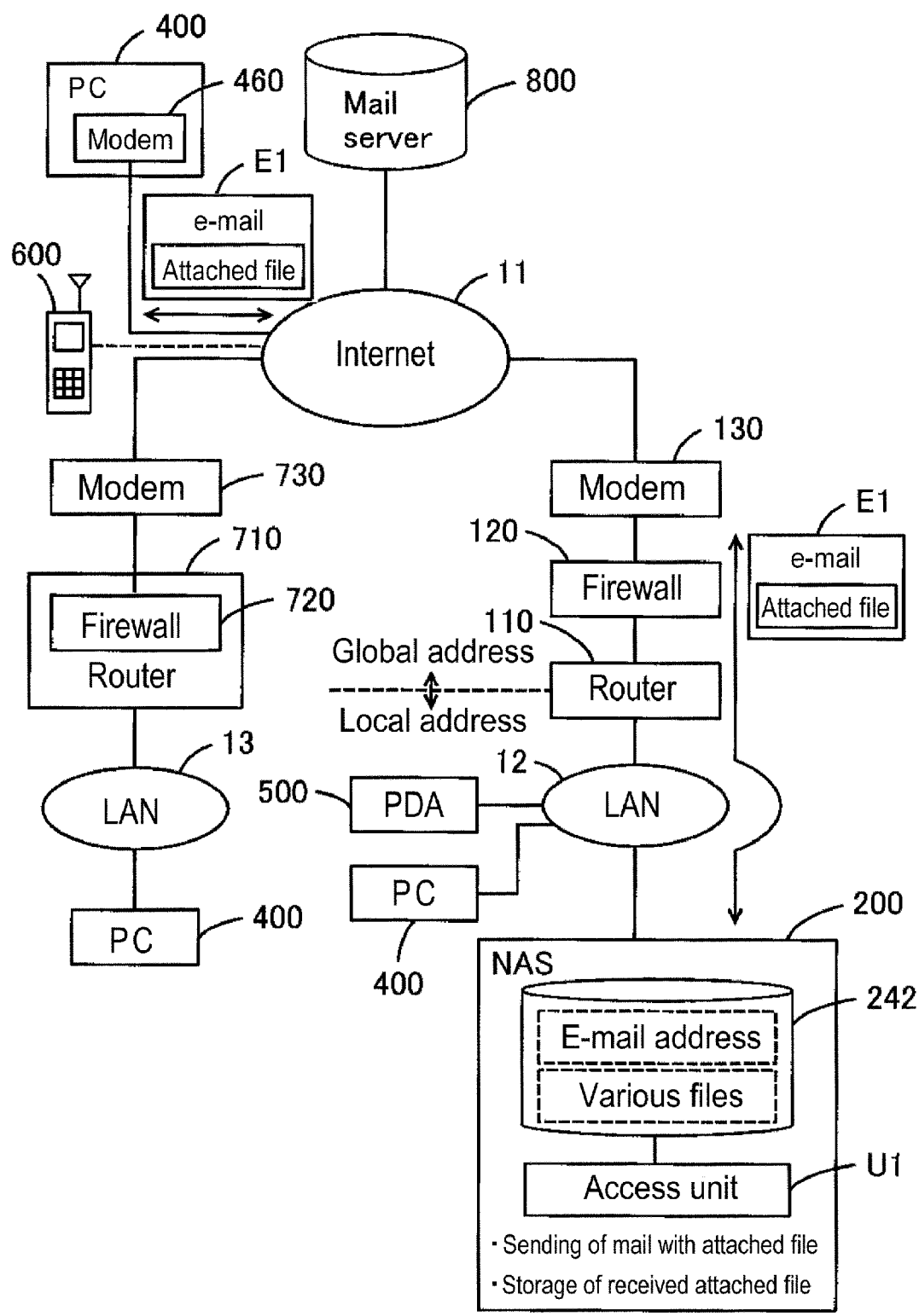
FIG. 1 is an exemplary illustration of a block diagram schematically showing the configuration of a storage system.

FIG. 1 shows the configuration of a storage system 1000 as claimed in an embodiment of the present invention. This system 1000 is at least provided with a NAS (storage device) 200 connected to an internal network 12 enabling two-way communication of information, and at least provided with a terminal connected to an external network 11. A typical example of the internal network is an Ethernet (registered trademark) or other LAN. The internal network may be a wired network in the manner of a wired LAN or a wireless network in the manner of a wireless LAN. Naturally, the internal network may also be a Wide Area Network (WAN) and the like provided it is a different network from the external network. In the present embodiment, an explanation is provided of the internal network 12 in the form of an LAN.

A typical example of the external network 11 is the Internet. Naturally, the external network 11 may be a WAN and the like provided it is a different network from the internal network.

Only the NAS 200 may be connected to the internal network, or a personal computer (PC) 400, Personal Digital Assistant (PDA) 500, cell phone, game machine or other type of terminal may also be connected. For example, a plurality of devices can be connected to a router 110 through a line concentrator such as a hub. Only one or a plurality of NAS may be provided.

The internal network 12 is connected to the external network 11 through the router 110, a firewall 120 and a modem 130. The router 110 is a relay device for converting the protocol between data flowing within an LAN 12 and data flowing within the external network 11. The router 110 is provided with, for example, an LAN adapter circuit physically connected to the LAN 12, a circuit for realizing transmission and reception of data between the LAN adapter circuit and the modem, a Central Processing Unit (CPU) for controlling processing such as imparting an Internet Protocol (IP) address to the NAS 200 and the like, Read Only Memory (ROM), Random Access Memory (RAM), and a timer circuit.

The firewall 120 is a system for preventing unauthorized access to the LAN 12 from the outside such as from the external network 11. More specifically, the firewall 120 monitors data flowing through the boundary with the outside, detects any unauthorized accesses and blocks those accesses so as to prevent eavesdropping, tampering and destruction of data and programs through an external network. The firewall function may be realized in the form of dedicated hardware as shown in the drawings, or it may be realized by installing a program for realizing a firewall function in a computer. For example, in the case of large corporations, an information management system having a firewall function is installed between a router and an external network. Naturally, the firewall 120 may also be incorporated in the router 110.

The modem 130 is a modulation-demodulation device that converts digital data sent from the router 110 through the firewall 120 into telephone line signals (including optic fiber communication signals) and transmits the signals to the external network 11, or converts signals sent from the external network 11 to digital data and outputs the data to the router 110 through the firewall 120.

A terminal such as the personal computer (PC) 400, PDA or game machine and the like having a built-in modem 460 can be connected directly to the external network 11, and together with a wireless terminal such as a cell phone 600 being able to connected indirectly through a gateway and base station, a terminal such as the PC 400, PDA or game machine can be indirectly connected through a modem 730, a firewall 720, a router 710 and an LAN (second internal network) 13. In addition, a mail server 800 for enabling data communication of e-mail between external terminals connected to the external network and the NAS 200 is connected to the external network 11.

In order to carry out data communication through the external network, it is necessary to use network addresses (such as IP addresses) uniquely assigned to devices connected to the external network in the form of global addresses as addresses. On the other hand, in order to carry out data communication through the internal network, it is necessary to use network addresses (such as IP addresses) uniquely assigned to devices connected to the internal network in the form of local addresses as addresses. An administrator of the internal network can freely assign local addresses to devices connected to the internal network. The uniqueness of these local addresses is not guaranteed on the external network. Thus, a network exchange such as a router 110 for exchanging global addresses assigned on the external network and local addresses assigned on the internal network is provided between both networks. Here, as long as a network exchange is not specially set, processing such as readout of files from a terminal connected to the external network or storage of files from the terminal cannot be carried out with respect to a storage medium of a device in the manner of an NAS 9200 only assigned a local address as shown in FIG. 26.

In addition, the firewall 120 provided between both networks blocks actions such as readout of data contained in devices on the internal network from the external network or writing of data to devices on the network. Thus, unless a firewall is specially set, the readout of files from a terminal connected to the external network or the storage of files from the terminal cannot be processed with respect to a storage medium of a device only assigned a local address as shown in FIG. 26.

Figure 26:
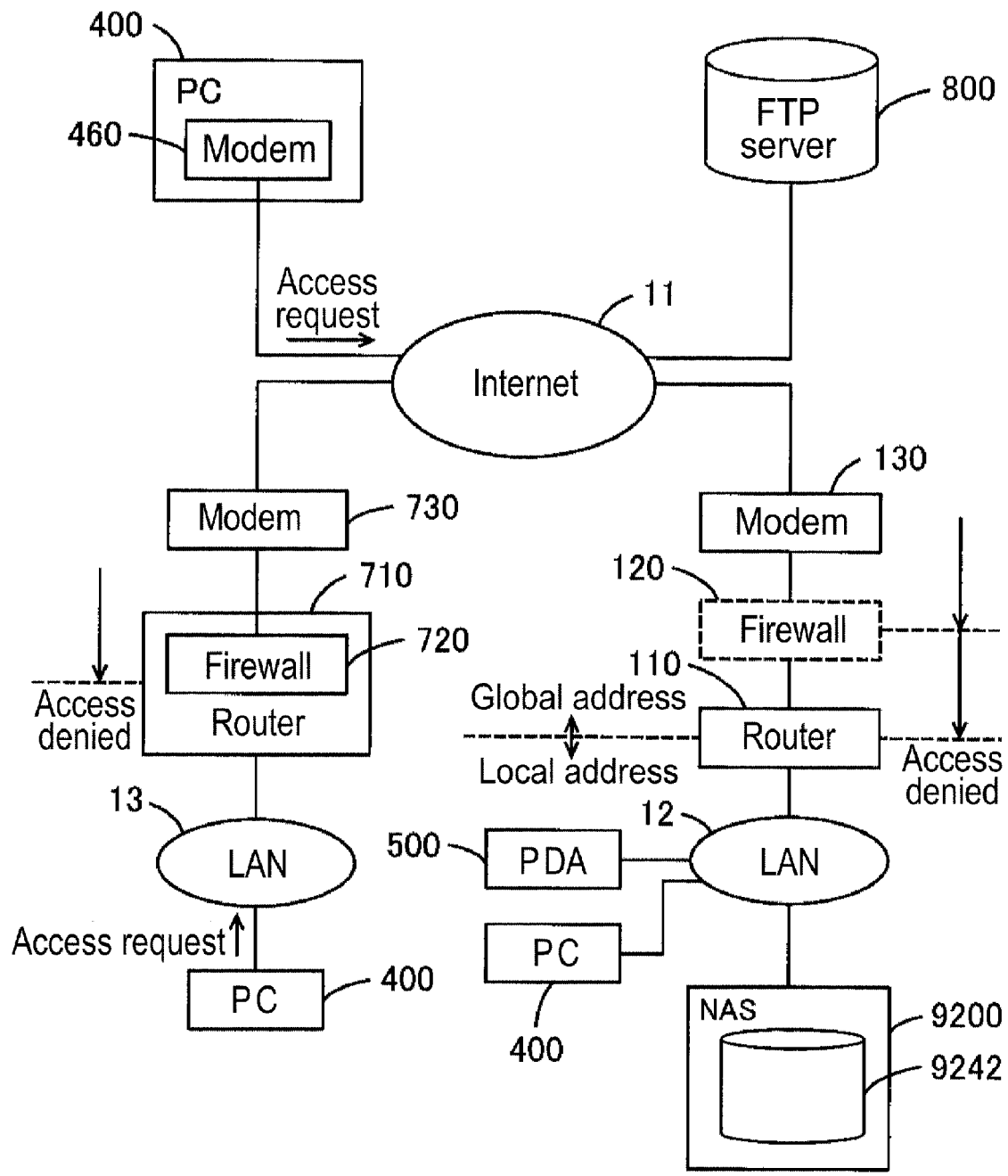
FIG. 26 is an exemplary illustration of a block diagram schematically showing a comparative example of a storage system.

In the storage system 9000 shown as a comparative example in FIG. 26, an FTP server 9900, for example, is connected to the external network 11 in order to falsely access a storage medium 9242 of the NAS 9200. The data structure of the storage medium of this FTP server 9900 is the same as the data structure of the storage medium 9242 of the NAS.

As has been described above, an external terminal such as the PC 400 and the FTP server 9900 are connected to the same external network 11, and are able to carry out data communication of files by mutually designating global addresses. However, in addition to requiring a separate FTP server while also being necessary to carry out processing for maintaining the same data structure between the storage medium of the FTP server and the storage medium of the NAS, in the case of connecting an external terminal such as the PC 400 to the external network 11 via the second internal network 13, access to the external terminal may be denied depending on the restrictions of the router 710 and the firewall 720.

Therefore, in the system 1000, an access unit U1 is provided in the storage device 200 for accepting access to a storage medium 242 for storing files from an external terminal connected to the external network 11 by carrying out data communication of an e-mail E1 with the external terminal by attaching a target file for accessing the storage medium 242 to the e-mail E1.

Figure 2:
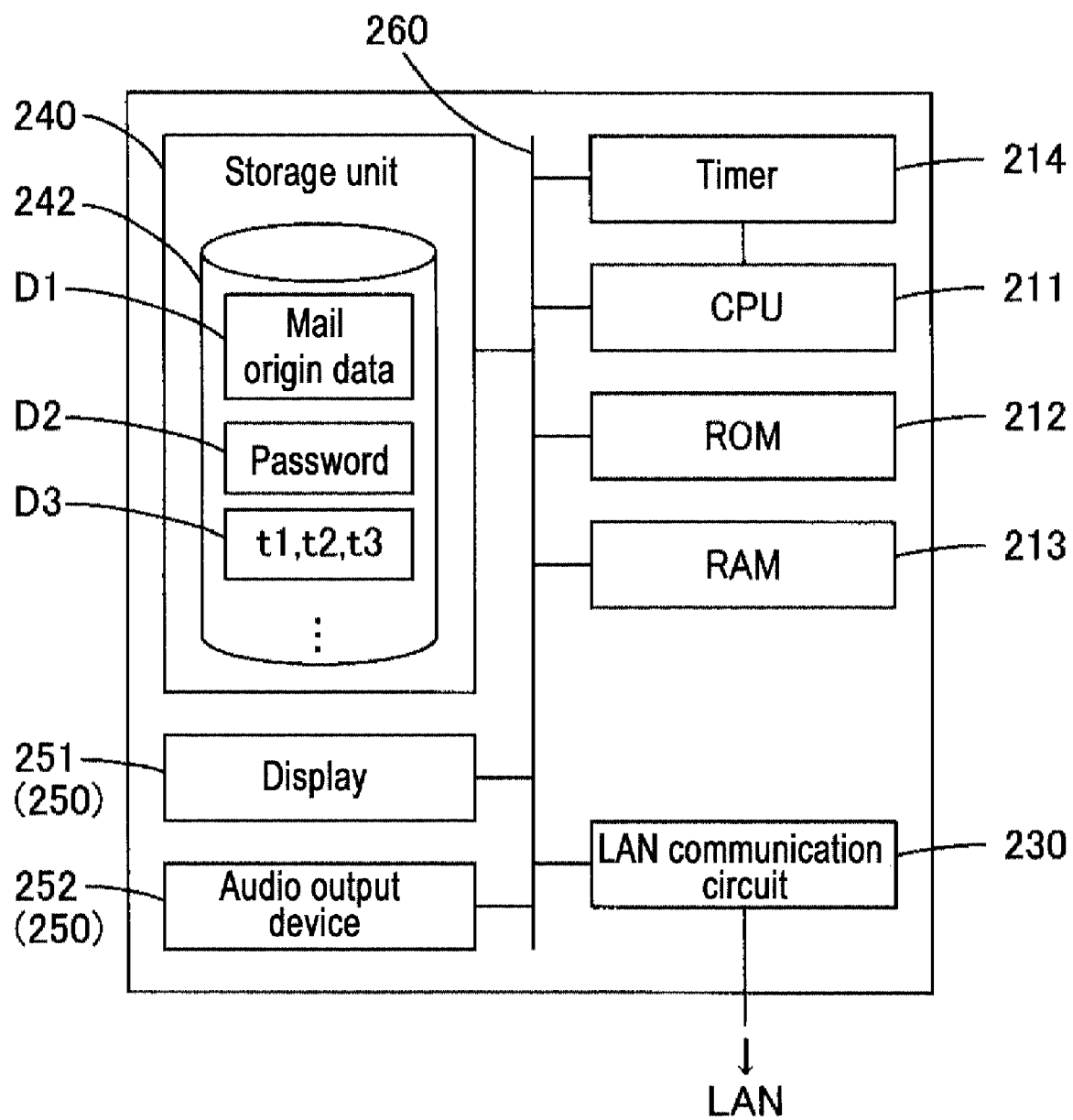
FIG. 2 is an exemplary illustration of a block diagram schematically showing the hardware configuration of a storage system.

As shown in FIG. 2, in the NAS 200, a CPU 211, semiconductor memory 212 and 213, a timer circuit 214, a LAN communication circuit 230, a storage unit 240, an output device 250 and the like are connected to a prescribed system bus 260 to enable mutual input and output of information. The devices 200, 400, 500 and the like connected to the LAN 12 are capable of mutual data communication through the LAN communication circuit within each device. Although not required to be provided, a display 251 such as a liquid crystal display or an audio output device 252 that outputs a beeping tone and the like are used for the output device 250. A CPU 211 controls overall operation of the NAS by carrying out processing for suitably executing a storage device control program or a program for controlling readout of various information from the storage unit 240 to the RAM 213 in accordance with a program written in the ROM 212.

Within the NAS 200, processing to be described later is carried out in parallel based on a timetable format using timer interruption according to the timer circuit 214, for example. The LAN communication circuit 230 is connected to the LAN 12 and is able to carry out two-way communication through the LAN 12 according to TCP/IP, for example. The storage unit 240 has the information storage medium 242 such as a hard disk and a drive such as a hard disk drive for reading and writing information to and from the information storage medium, and various control programs and information are stored in this storage medium 242. A magnetic storage medium such as a hard disk, CD-ROM, non-volatile semiconductor memory or power backed-up volatile semiconductor memory and the like can be used for the storage medium 242. E-mail addresses imparted to the NAS 200, origin data D1 for sending e-mails, data D2 representing passwords, data D3 representing reception conditions and the like are stored in the storage medium 242.

Figure 6:
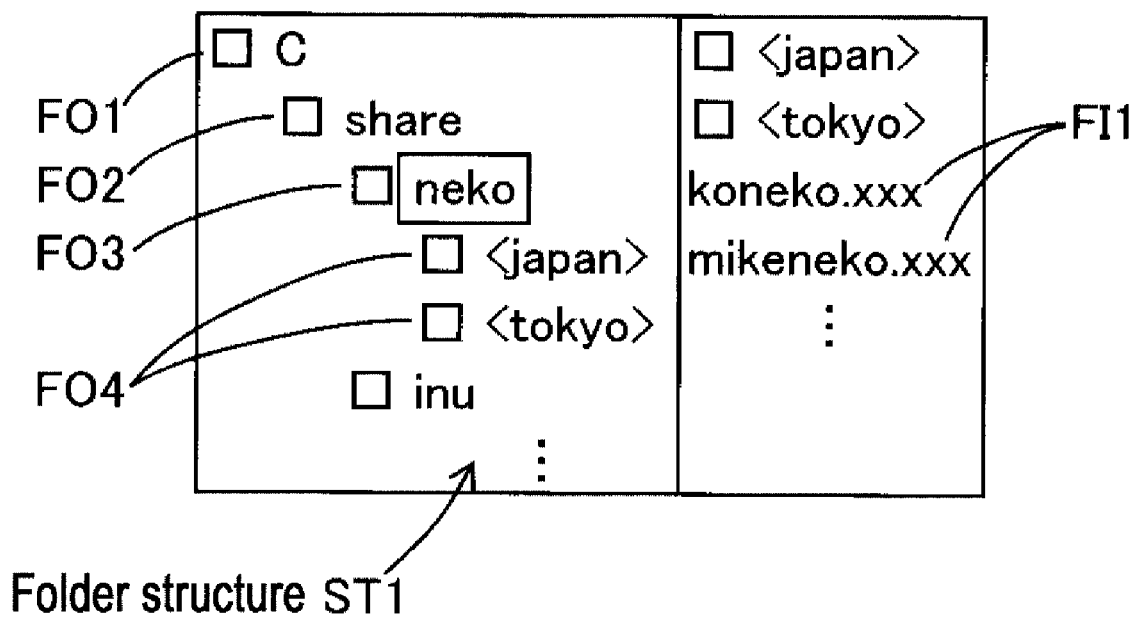
FIG. 6 is an exemplary illustration of a block diagram schematically showing the configuration of folders formed in a storage medium.

As shown in FIG. 6, a hierarchical data structure ST1 containing folders FO1 to FO4 is formed in the storage medium 242 according to a prescribed file system, and files F11 are saved and stored in the hierarchical folders FO1 to FO4. A program for forming the file structure ST1 in the storage medium 242 and realizing the file system for storing files F11 is recorded in the ROM 212 and the storage medium 242. This file system has functions for managing data recorded in the recording medium, including creation, movement or deletion of files and folders in the storage medium and readout of files from the storage medium, in accordance with prescribed data recording format. Normally, the file system is provided as one of the functions possessed by the operating system (OS). Files refer to collections of data recorded on the storage medium, and are the units in which data is managed by the OS. Folders are also called directories, and refer to storage locations for categorizing and organizing files. Folders have a hierarchical structure that allows files to be further stored in folders within folders. In the example shown in FIG. 6, the folder structure ST1 is shown on the left side, while the contents of a folder FO3 entitled "neko" are shown on the right side.

Figure 3:
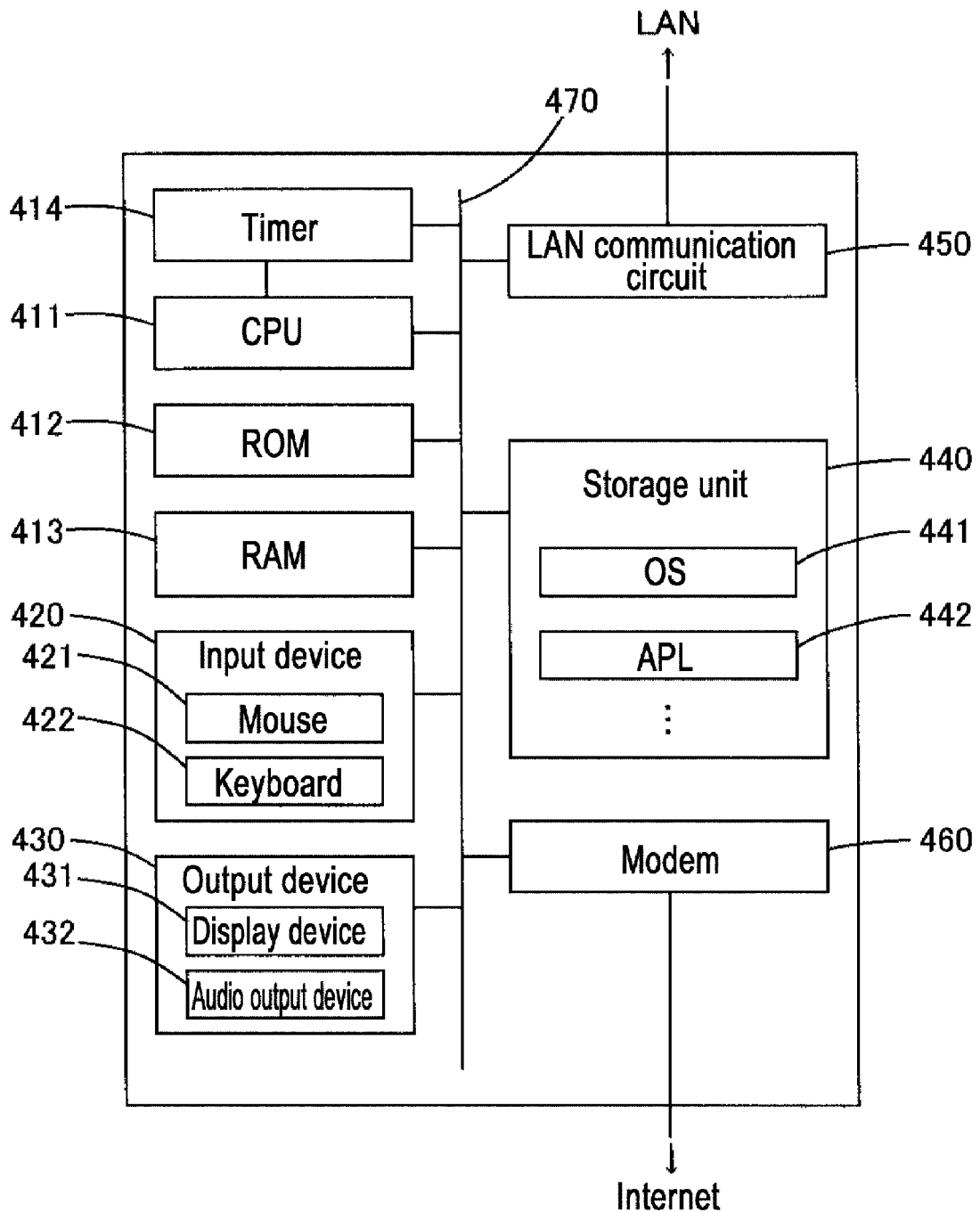
FIG. 3 is an exemplary illustration of a block diagram showing the hardware configuration of a personal computer.

As shown in FIG. 3, in the PC 400, a CPU 411, semiconductor memory 412 and 413, a timer circuit 414, an input device 420, an output device 430, a storage unit 440, an LAN communication circuit 450 and the modem 460 and the like are connected to a prescribed system bus 470 enabling mutual input and output of information. The CPU 411 controls overall operation of the PC by carrying out processing for suitably executing an OS 441 and an application program (APL) 442 such as mail software as well as a program for controlling readout of various information from the storage unit 440 to the RAM 413 in accordance with a control program written in the ROM 412.

Within the PC 400, processing to be described later is carried out in parallel based on a timetable format using timer interruption according to the timer circuit 414, for example. The LAN communication circuit 450 is connected to the LAN 12 and is able to carry out two-way communication through the LAN 12 according to TCP/IP, for example. The input device 420 has a pointing device 421 such as a mouse and a keyboard 422 as operational input devices, and receives operational inputs from a user. The output device 430 has a display device 431 such as a display or an audio output device 432 such as an audio generator as information output devices, and outputs information to a user by display or audio output. Naturally, information may also be output by connecting a printing device such as a printer to the PC and printing out information with the printing device. The storage unit 440 has an information storage medium such as a hard disk and a drive such as a hard disk drive for reading and writing information to and from the storage medium, and an OS 231, an APL 232 and various information are stored in this storage medium. A magnetic storage medium such as a hard disk, CD-ROM, non-volatile semiconductor memory or power backed-up volatile semiconductor memory and the like can be used for the storage medium.

Figure 4:
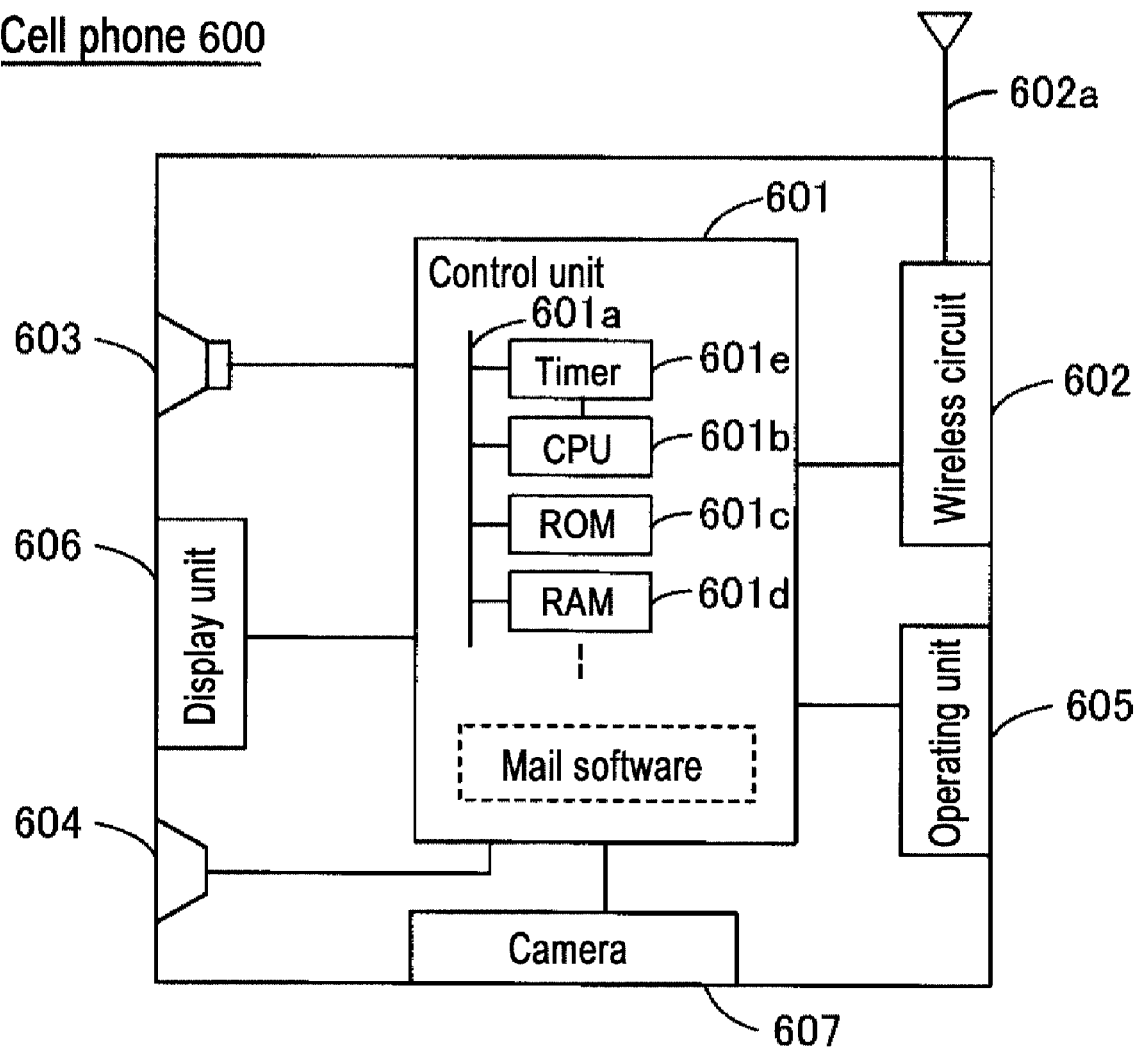
FIG. 4 is an exemplary illustration of a block diagram showing the hardware configuration of a cell phone.

As shown in FIG. 4, a cell phone 600 is provided with a control unit 601 having a CPU 601b, semiconductor memory 601c and 601d, a timer circuit 601e and the like connected to a system bus 601a, and a wireless circuit 602 for converting analog signals from an antenna 602a to digital signals and processing those signals, an audio output device 603 for audio output, an audio input device 604 for audio input, an operating unit 605 for accepting operational inputs from a user by, for example, a plurality of keys, a display unit 606 such as a liquid crystal panel for displaying call status or e-mail and the like on a screen, and a CCD camera 607 for capturing still images and the like are connected to the control unit 601 to enable mutual input and output of information. A base station for the cell phone 600 is connected to a gateway and carries out short-distance wireless communication with the cell phone 600. The gateway converts the protocol of data from the base station and transmits it to the mail server 800, for example, or converts the protocol of data from the mail server 800 and transmits it to the base station.

Figure 5:
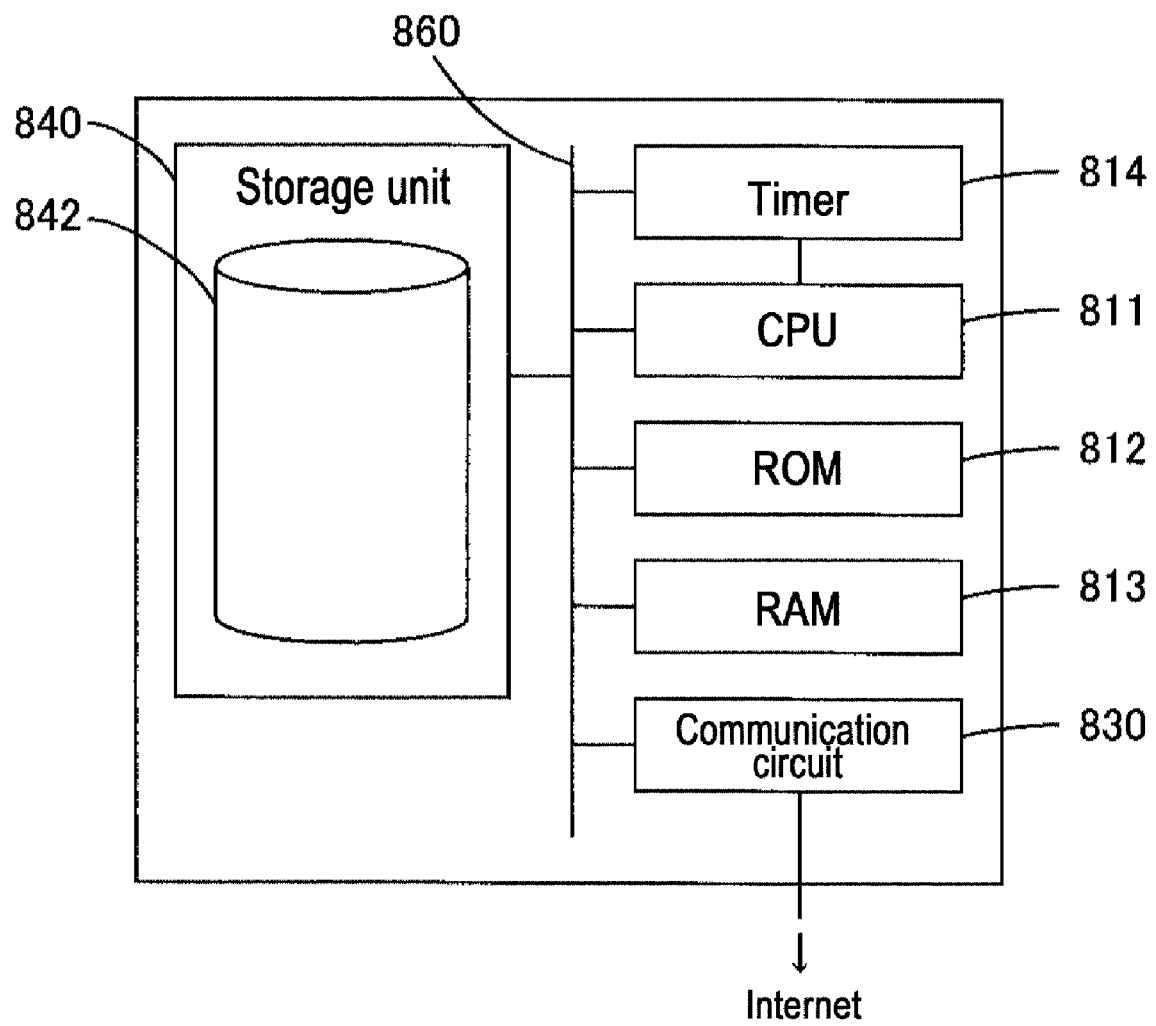
FIG. 5 is an exemplary illustration of a block diagram showing the hardware configuration of a mail server.

As shown in FIG. 5, in the mail server 800, a storage unit 840 having a CPU 811, semiconductor memory 812 and 813, a timer circuit 814 and an information storage medium 842 and the like is connected to a prescribed system bus 860 to enable mutual input and output of information. A communication circuit 830 is connected to the external network 11 and is able to carry out two-way communication through the external network 11 by TCP/IP, for example. A magnetic storage medium such as a hard disk, CD-ROM, non-volatile semiconductor memory or power backed-up volatile semiconductor memory and the like can be used for the storage medium 842. E-mail addressed to the NAS 200 from an external terminal is temporarily stored in the storage medium 842 and then sent to the NAS 200 through networks 11 and 12 in response to a mail acquisition request from the NAS 200. E-mail addressed to an external terminal from the NAS 200 is also temporarily stored in the storage medium 842 and then sent to the external terminal through the external network 11 in response to a mail acquisition request from that terminal.

(2) Operation and Action of Storage System Containing Storage Device

Figure 7:
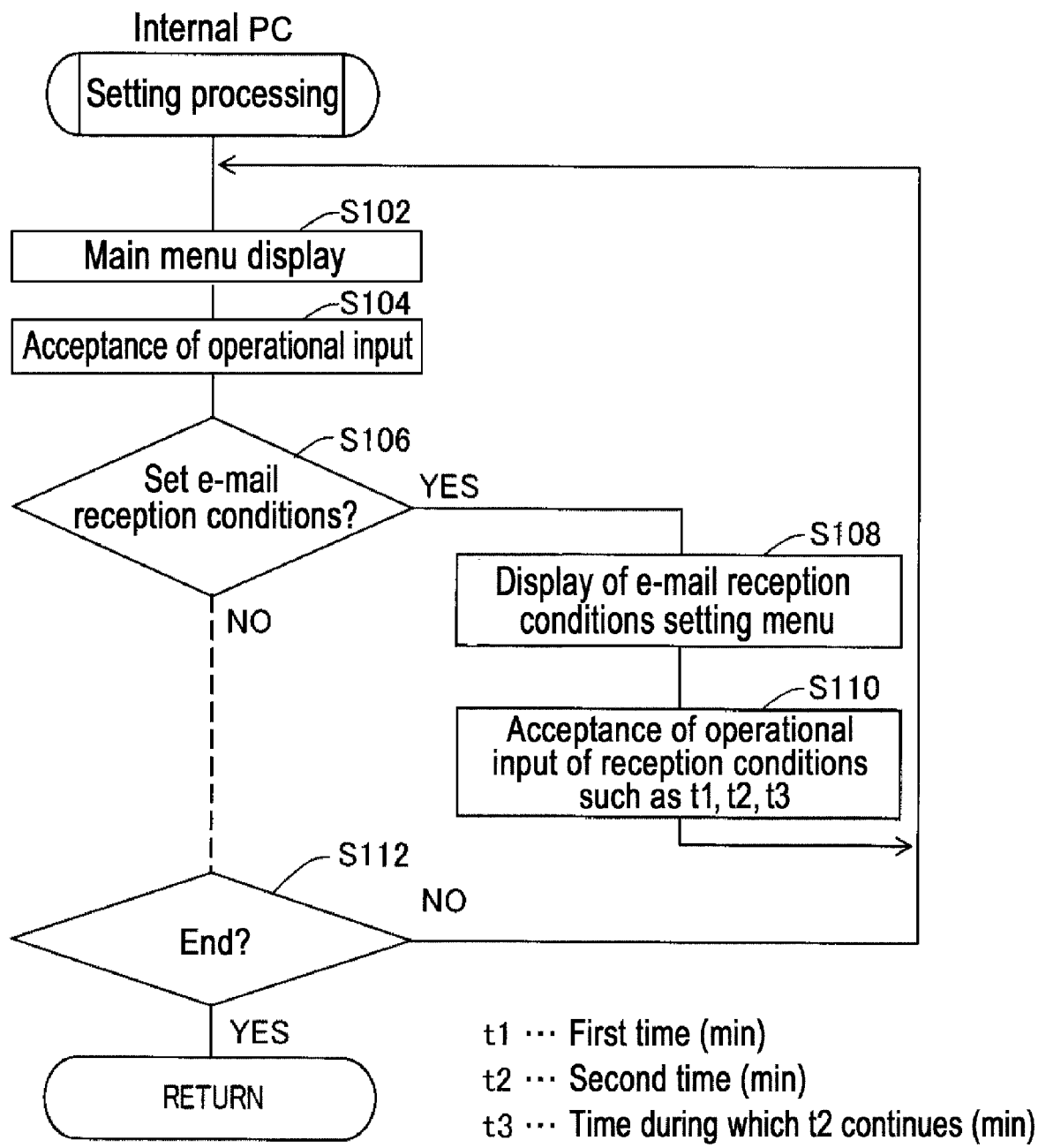
FIG. 7 is an exemplary illustration of a flow chart showing setting processing carried out by an internal personal computer.

FIG. 7 shows an example of setting processing carried out by the PC 400 connected to the LAN 12. This processing is initiated by a user carrying out an operation that starts up a setting processing program. Although this processing is not essential in terms of carrying out the present invention, as a result of carrying out this processing, reception conditions and the like when e-mail is received by the NAS 200 are set more easily than by inputting to a PC. Furthermore, this processing is carried out in a device within the PDA 500 and the like connected to the LAN 12.

When this setting processing has been initiated by the PC, a main menu for selecting a menu item for setting operating conditions of the NAS is first displayed on a display (Step S102, the word "step" will hereinafter be omitted). A plurality of menu items are listed on the main menu, and an area for accepting operations for making menu selections and various buttons and the like are provided thereon. When any of the menu items or buttons is selected with a pointing device and the like, an operational input is accepted from the PC user (S104). Next, a judgment is made as to whether or not a menu item for setting the reception conditions when receiving e-mail by the NAS has been selected (S106), and when those conditions have been met, the processing of S108 to S110 is carried out after which setting processing returns to S102, or setting processing proceeds to S112 when the conditions have not been met.

In S108, an e-mail reception condition setting menu is displayed for setting reception conditions when receiving e-mail by the NAS. A first input column for accepting operational input of a time interval in the form of a first time t1 (minutes) for confirming the arrival of an e-mail by the NAS when not receiving an e-mail for the purpose of requesting access to the storage medium 242, a second input column for accepting operational input of a time interval in the form of a second time t2 (minutes) for confirming the arrival of an e-mail when an e-mail has been received for the purpose of requesting access to the storage medium 242, and a third input column for accepting operational input of a time in the form a time t3 (minutes) during which t2 for confirming the arrival of an e-mail after having received the final e-mail for the purpose of requesting access to the storage medium 242 continues, for example, are provided on this menu. Furthermore, the relationship of these times is such that $0<t2<t1$ and $t3>t2$. In S110, operational inputs for these input columns are accepted from a keyboard and the like after which setting processing returns to S102.

Processing in the case of other menu items being selected is carried out in the same manner. In S112, a judgment is made as to whether or not this setting processing has been completed by, for example, judging whether or not an end button on the main menu has been operated, and in the case processing is not completed, setting processing returns to S102, while setting processing ends in the case it has been completed.

Figure 8:
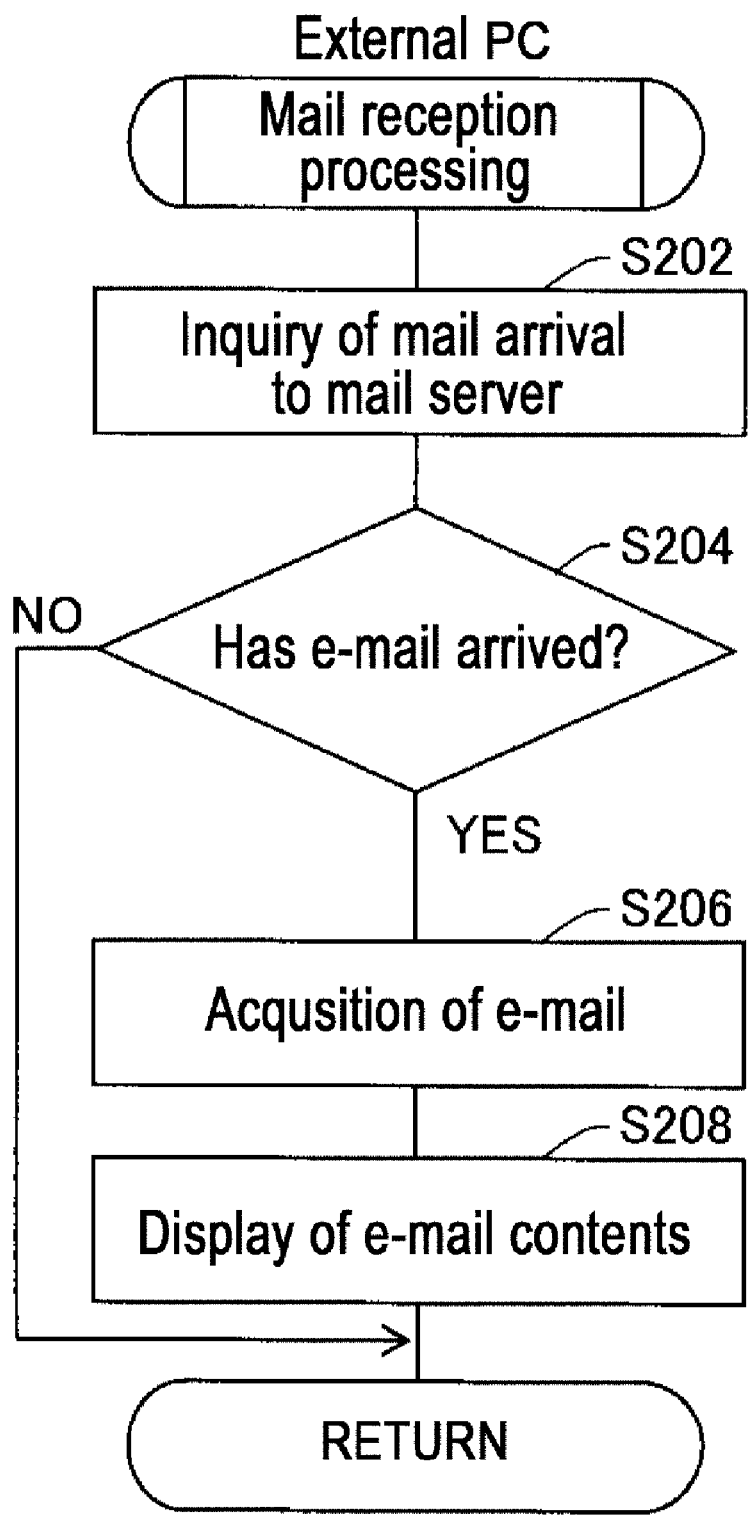
FIG. 8 is an exemplary illustration of a flow chart showing mail reception processing carried out by an external personal computer.

FIG. 8 shows an example of mail reception processing carried out by the PC 400 connected to the external network 11. This processing is carried out repeatedly at prescribed time intervals, and involves imparting a mail address to the PC in advance and storing in the storage unit. Furthermore, this processing may also be carried out by an external terminal such as a portable terminal and the like connected to the external network 11.

When the PC initiates this mail reception processing, an inquiry is first made to the mail server 800 as to whether or not e-mail addressed to the PC itself has arrived (S202). The mail server carries out processing that returns information to the PC indicating whether or not unsent e-mail having the e-mail address imparted to the PC is stored in the storage medium 842 in response to a request from the PC. The PC then receives that information returned from the mail server. In S204, the PC then judges whether or not e-mail addressed to itself has arrived based on that returned information. Although mail reception processing is terminated in the case it has been judged that e-mail addressed to itself has not arrived, in the case it has been judged that e-mail addressed to itself has arrived, the PC carries out processing for acquiring the e-mail addressed to itself from the mail server (S206). The contents of the acquired e-mail are displayed on the display (S208) and mail reception processing ends.

Figure 15:
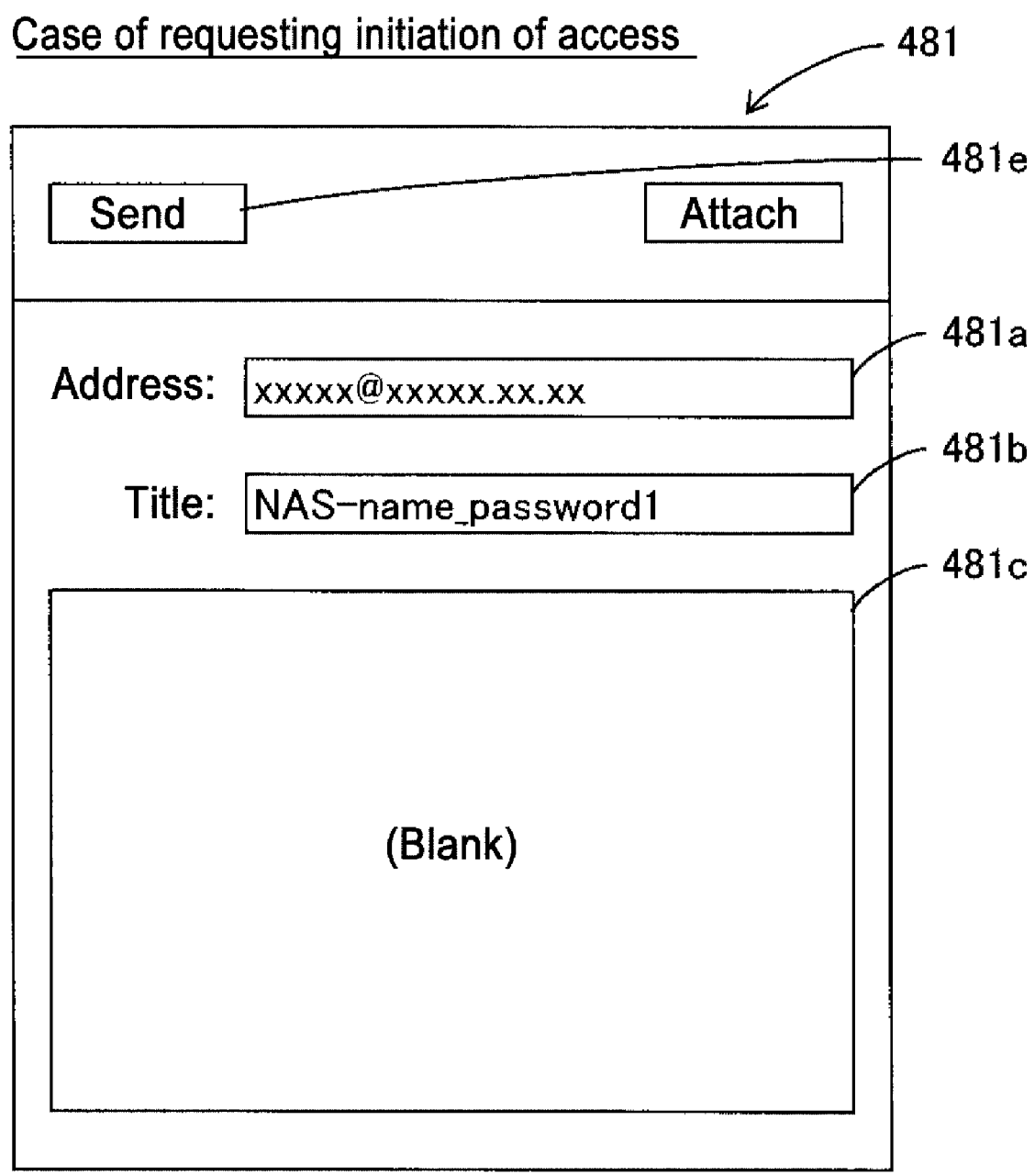
FIG. 15 is an exemplary illustration of a drawing showing a display of an e-mail in the case of requesting commencement of access.
Figure 16:
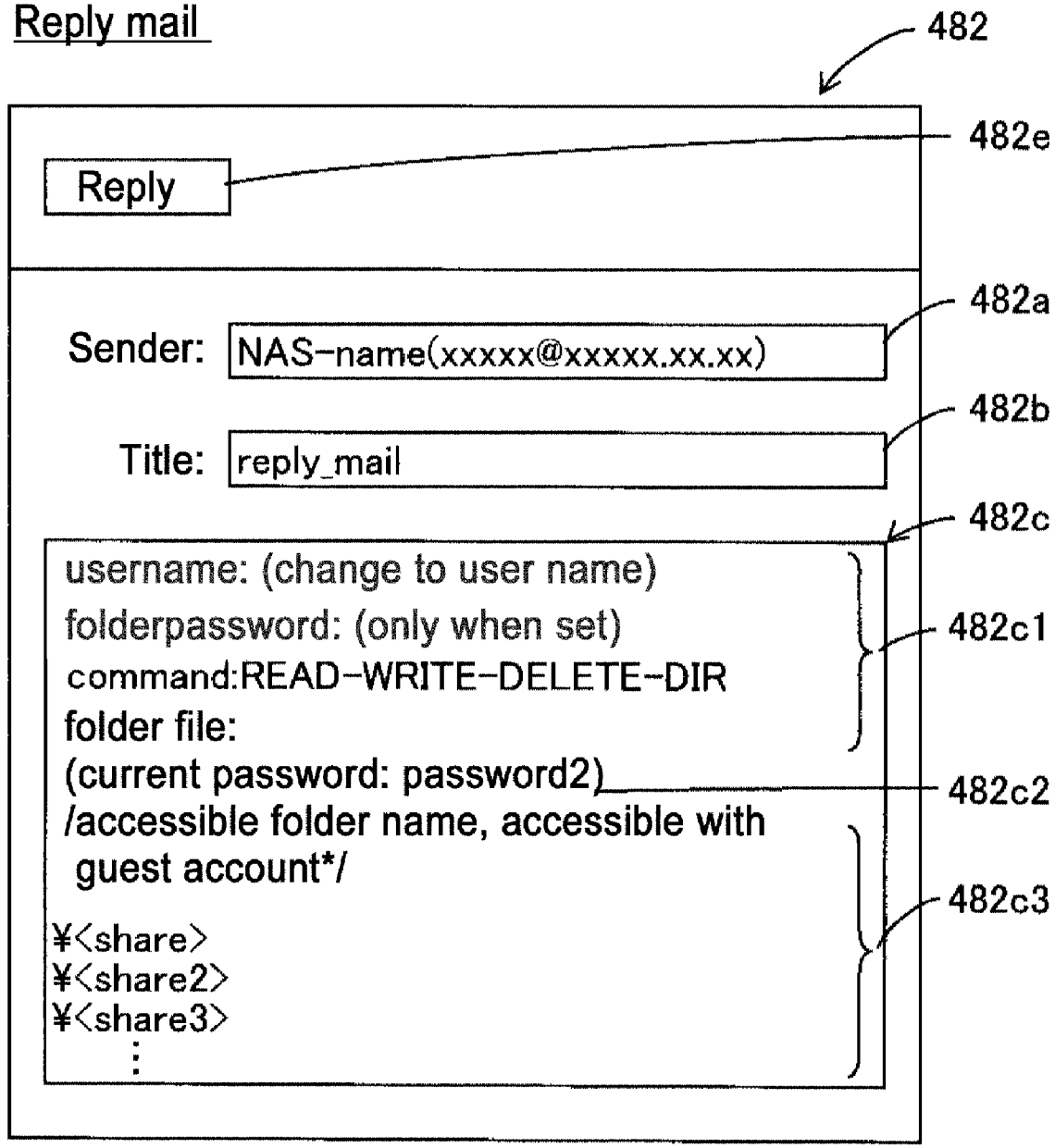
FIG. 16 is an exemplary illustration of a drawing showing a display of a reply mail in the case of having requested commencement of access.

In this system 1000, access to the storage medium 242 of the NAS 200 is accepted from an external terminal as a result of data communication of e-mails being carried out between the external terminal such as the PC 400 and the NAS 200 as shown in FIGS. 15 to 25. As shown in FIG. 16, commands requesting access to the storage medium 242 from a terminal include a READ (readout) command for reading out files from the storage medium, a WRITE (save) command for writing files to the storage medium, a DELETE command for deleting files and folders from the storage medium, and a DIR (directory) command for reading out the structure of folders from the storage medium. Furthermore, the types of commands for requesting access to the storage medium may be only a portion of these commands or commands other than these commands may also be included therein.

Here, a user of an external terminal may happen to forget the above-mentioned commands. There are many cases in which a user may not necessarily have the operating manual of this storage system when outside the workplace in particular. Therefore, in the present embodiment, by sending an e-mail for the purpose of requesting initiation of access to the storage medium 242 as shown in FIG. 15, requesting access to the storage medium 242 can be made by using a list of commands displayed in a reply mail as shown in FIG. 16. For example, as a result of a user entering the e-mail address of the NAS 200 in an address column 481a, entering the name of the NAS 200 (NAS-name) and a password1 in an title column 481b, and leaving the contents column 481c blank as in the e-mail display screen 481 shown in FIG. 15, an e-mail can be created for the purpose of requesting access initiation. When a send button 481e is operated with a pointing device and the like, an e-mail for the purpose of requesting access initiation can be sent to the NAS 200. At this time, the mail server 800 receives an e-mail from the PC and stores it in the storage medium 842, and then sends the e-mail to the NAS in response to a request from the NAS.

Figure 9:
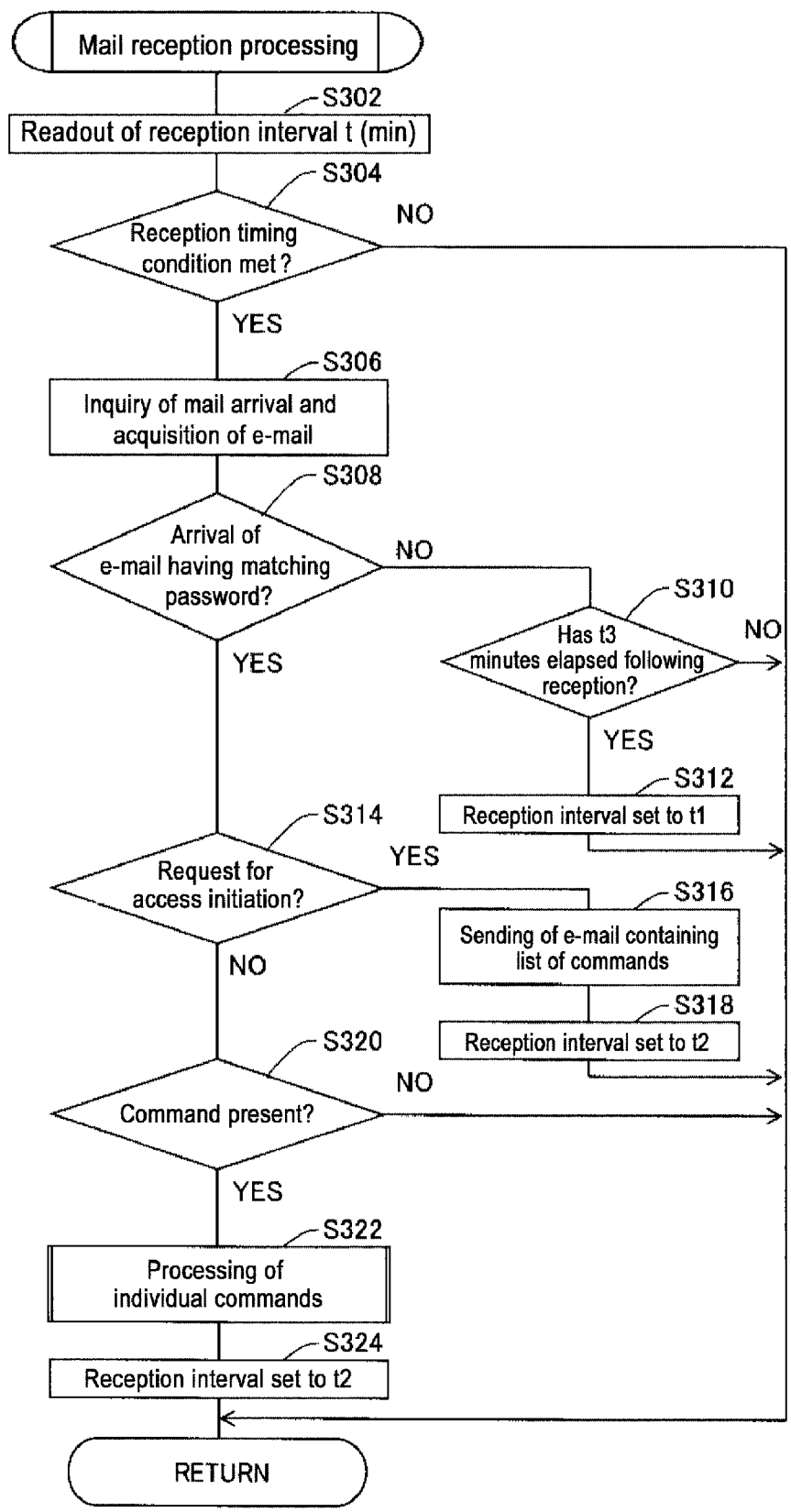
FIG. 9 is an exemplary illustration of a flow chart showing mail reception processing carried out by a storage device.

FIG. 9 shows mail reception processing carried out by the NAS 200. This processing is carried out repeatedly at a time interval equal to or less than the above-mentioned second time t2. Furthermore, the times t1, t2 and t3 are stored in the storage medium 242 of the NAS, the reception interval t (minutes) at which e-mail are acquired in S304 is stored in RAM 213, and t1 is stored for the initial value of t.

When the NAS initiates mail reception processing, the NAS acquires the elapsed time te (seconds) from the time of the previous inquiry of the arrival of e-mail at the mail server (S302). The elapsed time te can be determined from the current time Tnow kept by the timer circuit 214 and time of the previous inquiry of the arrival of e-mail at the mail server. Next, the reception interval t is acquired and a judgment is made as to whether or not the elapsed time te is equal to or greater than the reception interval t (S304). If this condition is not met (te<t), mail reception processing is terminated due to the reception timing. If this condition is met (te≧t), the mail server 800 inquires as to whether or not e-mail addressed to itself has arrived, and in the case e-mail addressed to itself has arrived, processing for acquiring the e-mail from the mail server is carried out (S306). The mail server then carries out processing for returning to the NAS information indicating whether or not an unsent e-mail address of the e-mail address imparted to the NAS is stored in the storage medium 842 in response to a request from the NAS. Therefore, the NAS receives the return information from the mail server and judges whether or not e-mail addressed to itself has arrived based on the return information.

As shown in FIGS. 15, 17, 19, 21, 23 and 25, an e-mail for the purpose of requesting access to the storage medium 242 is required to have a password for permitting access to the storage medium contained in the title column. Therefore, the NAS judges whether or not an e-mail of the proper format has arrived in which the password contained at the prescribed data position of the e-mail is the password corresponding to data D2 stored in the storage medium 242 (S308). If an e-mail itself has not arrived, an arrived e-mail is not of the proper format, or the password contained at the prescribed data position of an arrived e-mail does not match the password for permitting access, this condition is treated as not having been met, and processing proceeds to S310. Furthermore, in the case an e-mail that has arrived is not of the proper format, a message to that effect may be returned to the external terminal in the form of an error, while in the case the password contained in an arrived e-mail has not matched, a message to that effect may be returned to the external terminal in the form of an error. In S310, a judgment is made as to whether or not the above-mentioned third time t3 has elapsed from the time T1 at which a valid e-mail containing a password for permitting access was last received. For example, a judgment is made as to whether or not the time resulting from subtracting the time T1 from the current time Tnow kept by the timer circuit is greater than or equal to the time t3. Although mail reception processing ends without changing the time interval t if this condition has not been met (Tnow-T1<t3), if this condition is met (Tnow-T1≧t3), mail reception processing ends after setting the time interval t to the first time t1 (S312). As a result, when there is no longer a request for access to the NAS 200 from an external terminal, the NAS allows a comparatively long period of time for carrying out processing for receiving e-mails addressed to the NAS. Thus, the storage device can be accessed from an external terminal without placing a large burden on the mail server.

When the condition of S308 has been met, a judgment is made as to whether or not the arrived e-mail is an e-mail sent for the purpose of requesting initiation of access to the storage medium (S314). When an e-mail like that shown in FIG. 15 is received, the condition is treated as having been met, and an e-mail containing a list of access commands for accessing the storage medium as shown in FIG. 16 is sent to the external terminal (S316). At this time, the mail server 800 receives the e-mail from the NAS, stores it in the storage medium 842, and then sends the e-mail to the external terminal in response to a request from the external terminal.

FIG. 16 shows an example of a display screen 482 of the e-mail displayed on the external terminal. Information indicating the NAS 200 (such as the name and e-mail address of the NAS) is displayed in a sender display column 482a, a message indicating that the e-mail is a reply mail is displayed in a title column 482b, and a list of commands is displayed in the contents column 482c on the display screen 482. In addition to containing information 482c1 based on origin data D1 of the e-mail containing the list of commands, information displayed in the contents column 482c also contains, for example, a list of accessible folders 482c3, and in the case of changing the password for permitting access each time an e-mail is sent, a password 482c2 to be included in the next e-mail to be sent is also contained.

Here, when a user of an external terminal operates a reply button 482e, a reply e-mail display screen containing the information of the contents column 482c is displayed by processing of the mail software. Furthermore, as shown in FIGS. 17, 19, 21, 23 and 25, the e-mail address of the NAS 200 or a name corresponding to that e-mail address is automatically inserted into address columns 483a, 485a, 487a, 489a and 491a, and information of the contents column (482c) of the received e-mail is automatically inserted into contents columns 483c, 485c, 487c, 489c and 491c. At this time, when a user enters the name (NAS-name) and password of the NAS 200 in title columns 483b, 485b, 487b, 489b and 491b, deletes commands other than required commands from the list of commands in the contents column, and enters required information after deleting unnecessary information below "folder file:" in the contents column, an e-mail for the purpose of requesting access to the storage medium of the NAS can be created. When send button 483e, 485e, 487e, 489e or 491e is operated, the created e-mail can be sent to the NAS.

Furthermore, as shown in the drawings, in the case a user name for accessing the storage medium of the NAS is imparted to an external terminal, the user name may be allowed to be entered after "username:", and in the case a folder password for accessing a folder to be accessed is set for that folder, a folder password may be allowed to be entered after "folderpassword:". In these cases, a judgment is made in the NAS as to whether or not the user name entered after "username:" matches the user name imparted to the external terminal, a judgment is also made as to whether or not the folder password entered after "folderpassword:" matches the folder password set for the folder, and when the user name and folder password match, this condition is judged to have been met in S308, while when the user name and folder password do not match, a message to that effect may be returned to the external terminal in the form of an error.

In this manner, when the NAS receives an e-mail for the purpose of requesting initiation of access to the storage medium 242 from an external terminal, the NAS sends an e-mail containing a list of commands for accessing the storage medium 242 to the external terminal, and the external terminal sends an e-mail containing a command contained the list. When the NAS receives this e-mail, processing for the command contained in the e-mail is carried out on the storage medium 242. As a result, a user using the external terminal is able to execute access to the NAS by designating a command from the external terminal without having to remember commands for accessing the NAS. Thus, the storage system containing this storage device 200 is convenient.

Figure 17:
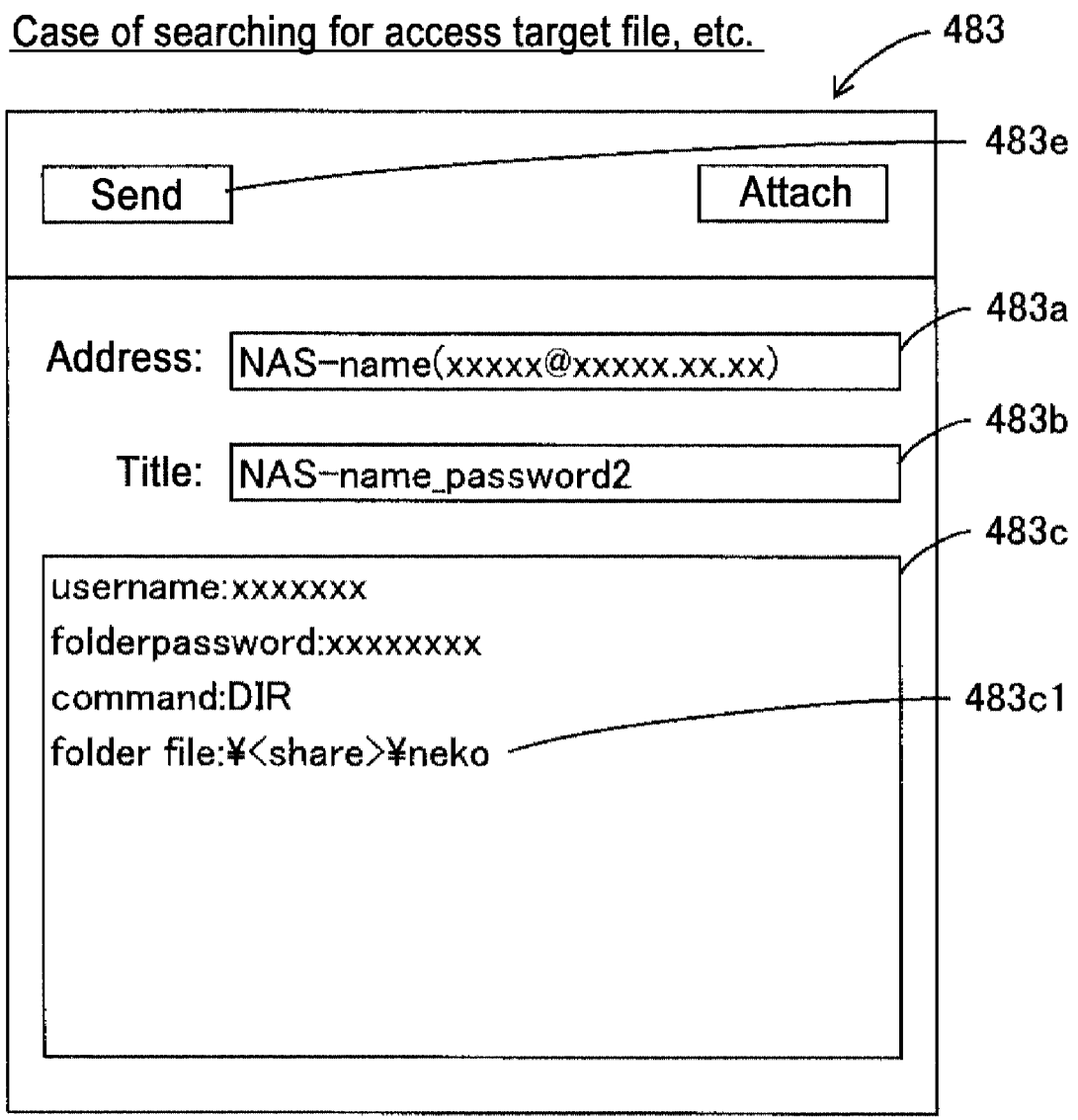
FIG. 17 is an exemplary illustration of a drawing showing a display of an e-mail in the case of searching for a file and the like to be accessed.

For example, in the case of reading a folder structure from the storage medium of the NAS, the path (character string indicating the location of a file or folder in a memory area) of the folder for which folder structure is desired to be read is entered below "folder file:" while leaving only the DIR command as in an e-mail display screen 483 shown in FIG. 17. As a result, an e-mail containing a directory command for reading out the folder structure of the storage medium of the NAS can be easily created, thereby making it possible to easily search for a file or folder to be accessed.

Figure 19:
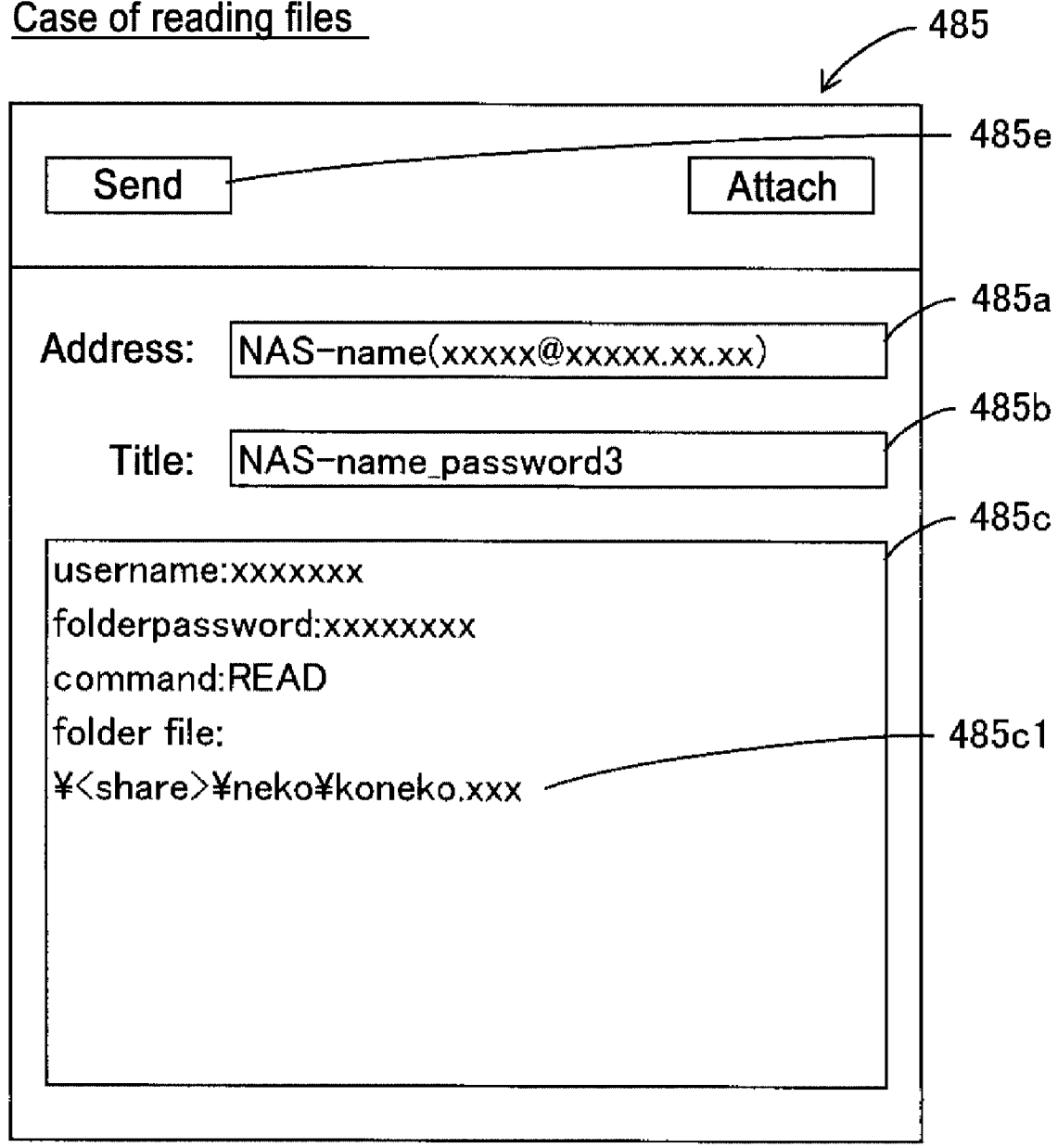
FIG. 19 is an exemplary illustration of a drawing showing a display of an e-mail in the case of reading out a file.

In addition, in the case of reading a file from the storage medium of the NAS, the path of the file desired to be read is entered below "folder file:" while leaving only the READ command as in an e-mail display screen 485 shown in FIG. 19. As a result, an e-mail for the purpose of requesting reading of a designated file from the storage medium of the NAS can be easily created, thereby making it possible to easily read a file desired to be read from the NAS from the storage medium of the NAS.

Figure 21:
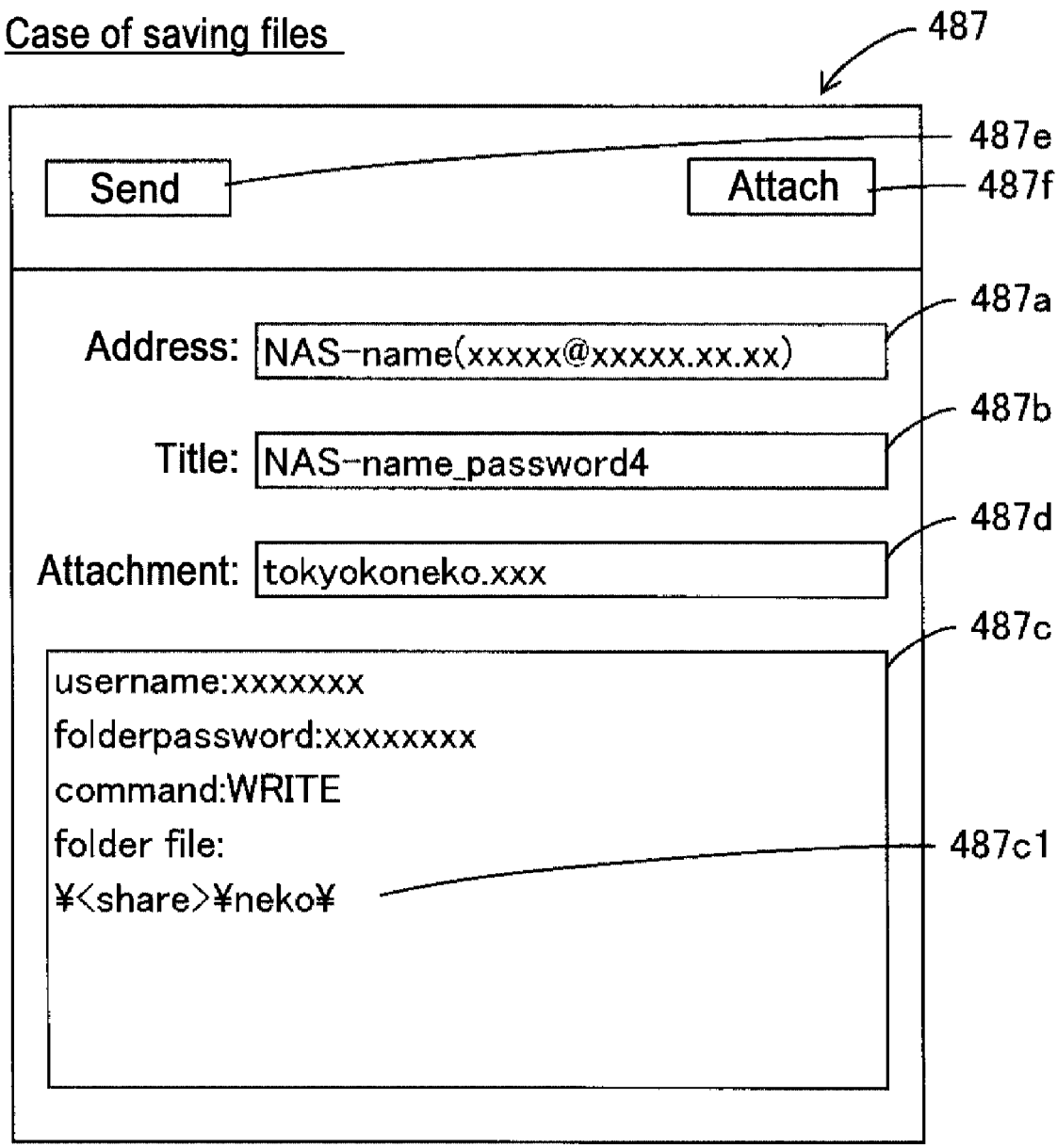
FIG. 21 is an exemplary illustration of a drawing showing a display of an e-mail in the case of storing a file.

Moreover, in the case of saving a file in the storage medium of the NAS, the path of the file desired to be saved is entered below "folder file:" while leaving only the WRITE command as in an e-mail display screen 487 shown in FIG. 21, the file desired to be saved is than attached to an e-mail by selecting that file and operating an attach button 487f. As a result, an e-mail for the purpose of saving an attached file in a specified area of the storage medium of the NAS can be easily created, thereby making it possible to easily read a file desired to be written to the NAS from the storage medium of the NAS.

Figure 23:
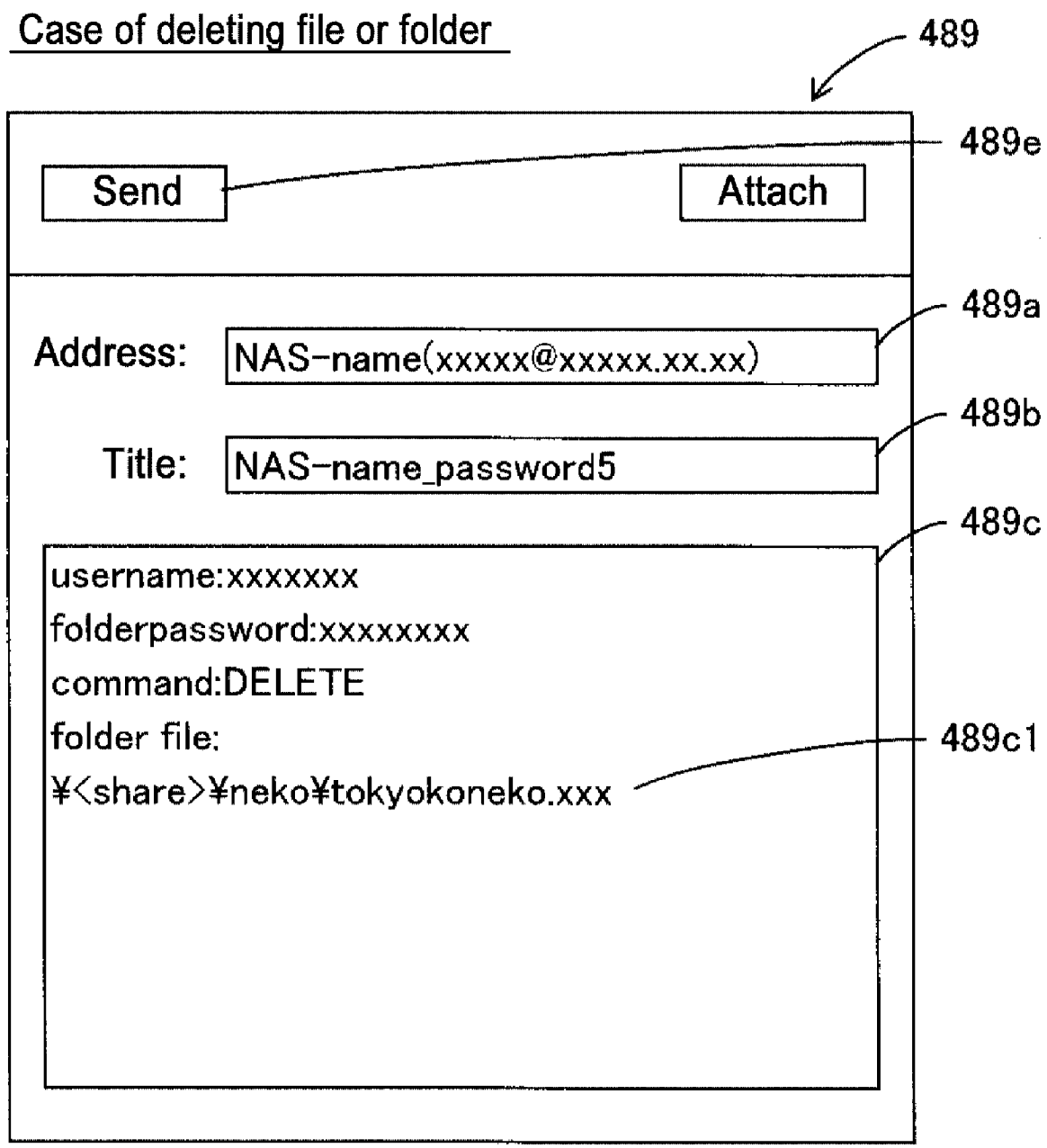
FIG. 23 is an exemplary illustration of a drawing showing a display of an e-mail in the case of deleting a file or folder.

Moreover, in the case of deleting a file or folder from the storage medium of the NAS, the path of the file or folder desired to be deleted is entered below "folder file:" while leaving only the DELETE command as in an e-mail display screen 489 shown in FIG. 23. As a result, an e-mail for the purpose of requesting deletion of a designated file or folder from the storage medium of the NAS can be easily created, thereby making it possible to easily delete a file or folder desired to be deleted from the NAS from the storage medium of the NAS.

Naturally, a user can also read, save or delete a file by carrying out an operation for designating a file from an external terminal without reading the folder structure from the storage medium of the NAS with the DIR command.

In the present embodiment, all files and folders stored in the storage medium of the NAS can be deleted. In this case, a DELETEALL command is operated by adding "ALL" after the DELETE command as in an e-mail display screen 491 shown in FIG. 25. As a result, an e-mail for the purpose of requesting deletion of all files and folders from the storage medium of the NAS can be easily created, thereby making it possible to format the storage medium of the NAS.

Furthermore, in the case of including a password different from that at the time of the previous transmission in an e-mail each time an e-mail is sent by the access unit of the NAS to an external terminal, and then sending that e-mail, a password 482c2, 484c2, 486c2, 488c2 or 490c2 to be contained in an the next e-mail to be sent is included as in the reply mail shown in FIGS. 16, 18, 20, 22 and 24. In this case, an e-mail for the purpose of requesting access to the storage medium of the NAS can be easily created by a user of an external terminal by operating the reply button 482e, 484e, 486e, 488e or 490e followed by entering the password 482c2, 484c2, 486c2, 488c2 or 490c2 in the title column 483b, 485b, 487b, 489b or 49 lb of the displayed reply e-mail display screen 483, 485, 487, 489 or 491 together with the name of the NAS 200 (NAS-name). The access unit of the NAS then judges whether or not an e-mail containing the password 482c2, 484c2, 486c2, 488c2, 490c2 described in S308 and the above-mentioned commands has arrived from an external terminal, and only carries out processing of the commands contained in the received e-mail in S314 to S322 on the storage medium 242 when that e-mail has been received.

In the above case, since the password for permitting access to the storage device changes each time an e-mail is sent, a function for defending against unauthorized access to the storage device can be improved.

When an e-mail containing the list of commands is sent to an external terminal in S316 of FIG. 9, the NAS 200 sets the time interval t to the second time t2 (S318) and terminates mail reception processing. As a result, processing for receiving e-mail addressed to the NAS is carried out during each time t2 that is shorter than the first time t1 when an e-mail has been received for the purpose of requesting initiation of access from an external terminal. Thus, the storage device can be accessed from an external terminal without placing a large burden on the mail server.

In addition, in the case the NAS has judged that an e-mail that has arrived in S314 is not an e-mail for the purpose of requesting initiation of access, a judgment is made as to whether or not the arrived e-mail is an e-mail that contains a command contained in the above-mentioned list of commands (S320). In the case an e-mail containing a command contained in the list of commands has been received from an external terminal, the condition is treated as having been met and processing for each command as shown in FIGS. 10 to 14 is carried out in S322, the time interval t is set to the second time t2 in S324 and mail reception processing ends. As a result, when an e-mail for the purpose of requesting access has been received from an external terminal, processing is carried out for receiving an e-mail addressed to the NAS during each time t2 that is shorter than the time t1. Thus, the storage device can be accessed from an external terminal without placing a large burden on the mail server.

On the other hand, the NAS ends mail reception processing in the case it judges that an e-mail that has arrived is an e-mail not containing the above-mentioned commands in S320. Subsequently, mail reception processing is again carried out, e-mails are received when the elapsed time te from the time of the previous inquiry of the arrival of e-mail at the mail server is equal to or greater than the first time t1 or the second time t2, and access processing corresponding to the above-mentioned commands is carried out.

As has been explained above, the access unit of the NAS carries out processing for receiving e-mails addressed to the NAS during each time t1, and when an e-mail for the purpose of requesting initiation of access has been received from an external terminal, processing for receiving e-mails addressed to the NAS is carried out during each time t2 that is shorter than the time t1, and processing of a command contained in the e-mail from the external terminal is carried out on the storage medium.

Figure 10:
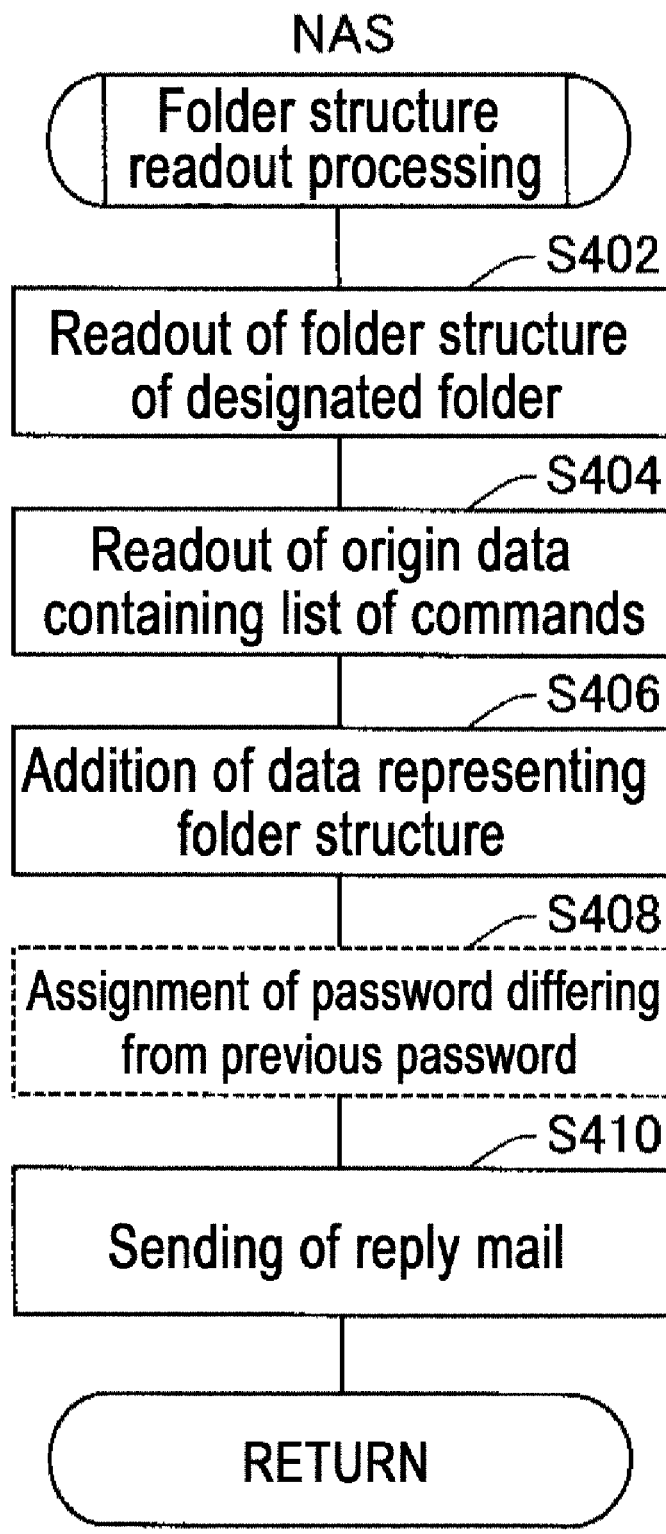
FIG. 10 is an exemplary illustration of a flow chart showing folder structure readout processing carried out by a storage device.

FIG. 10 shows an example of folder structure readout processing carried out in the above-mentioned S322 in the case the NAS 200 has received an e-mail containing a DIR command and a password for permitting access. This processing is carried out when an e-mail as shown in FIG. 17, for example, has been received from an external terminal.

When the NAS initiates processing, the NAS extracts information 483c1 representing the folder designated in the e-mail from the e-mail and reads out the file structure of the designated folder represented by this information 483c1 from the storage medium 242 (S402). Furthermore, in the case the designated folder is not formed in the storage medium, a message to that effect may be returned to the external terminal in the form of an error. Next, origin data D1 of the e-mail containing a list of commands is read from the storage medium (S404). As shown in the reply mail of FIG. 18, for example, this origin data is in the form of information representing the NAS 200 that is inserted into the sender display column 484a (such as the NAS name and e-mail address), information inserted into the title column 484b for the purpose of indicating this to be a reply mail, and information representing a predetermined portion 484c1 of the contents column 484c. Moreover, information 484c3 representing the folder structure read in S402 is added to the contents column 484c (S406). Furthermore, in the case of changing the password for permitting access each time an e-mail is sent, a password 484c2 differing from the previous password is assigned and this password is added to the contents column 484c (S408).

Figure 18:
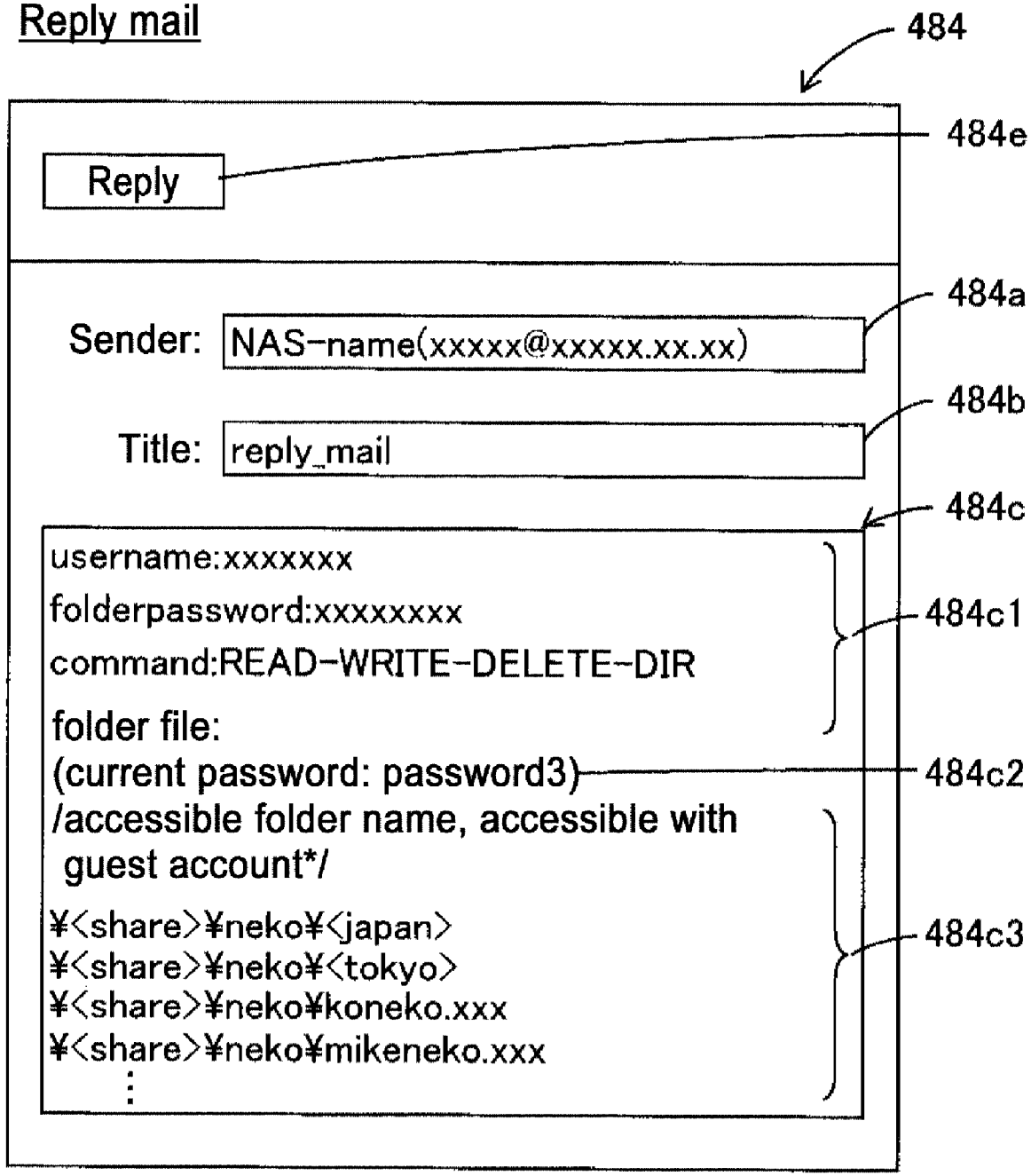
FIG. 18 is an exemplary illustration of a drawing showing a display of a reply mail in the case of having searched for a file and the like to be accessed.

Since an e-mail for replying to a DIR command is generated as a result of the above-mentioned processing, folder structure readout processing is completed by sending this e-mail to an external terminal (S410). Whereupon, the reply e-mail display screen 484 shown in FIG. 18 is displayed on an external terminal such as the PC 400. Therefore, a user of an external terminal can easily create an e-mail for the purpose of requesting access to the NAS while referring to the information 484c3 representing folder structure by operating the reply button 484e. For example, as shown in FIG. 19, when a user enters an NAS name and password in the title column (485b), deletes those commands other than a required command from the list of commands in the contents column (485c), enters required information after deleting unnecessary information below "folder file:" and then operates the send button (485e), an e-mail can be sent for the purpose of requesting access to the NAS.

Figure 11:
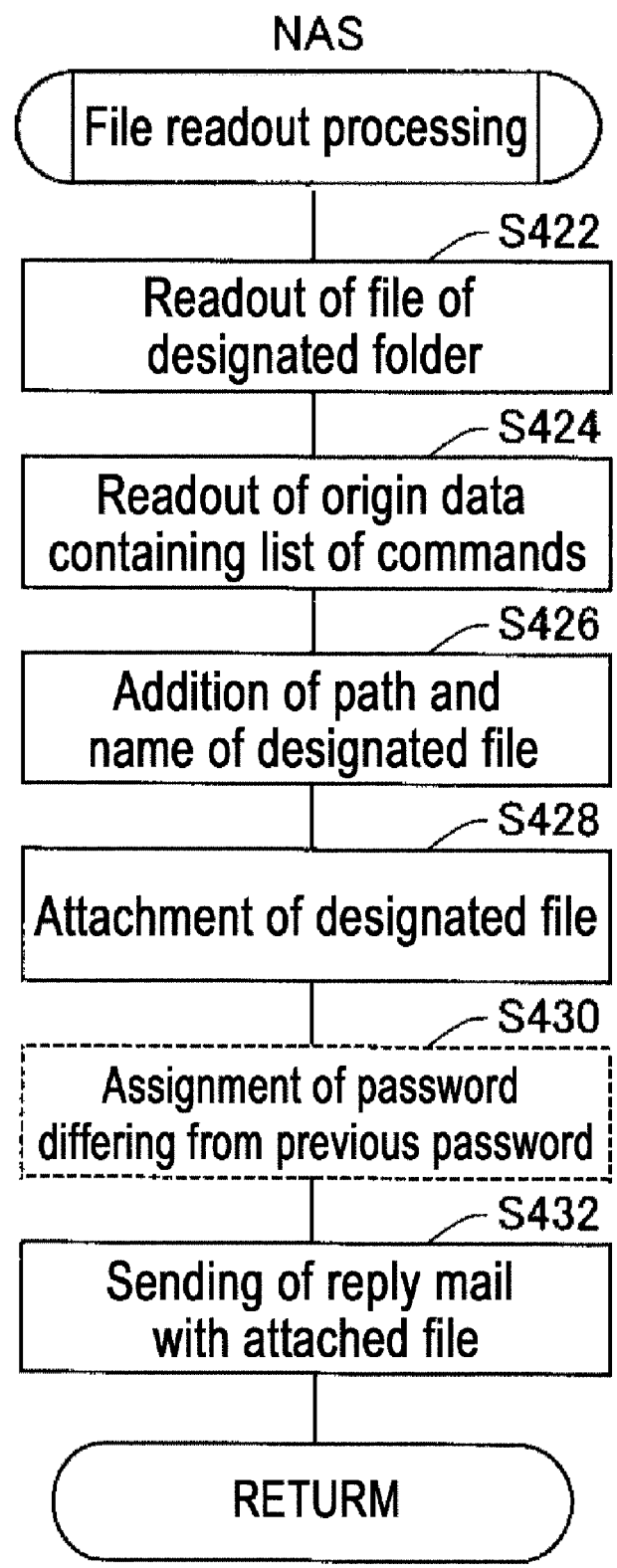
FIG. 11 is an exemplary illustration of a flow chart showing file readout processing carried out by a storage device.

FIG. 11 shows an example of file readout processing carried out in the step S322 described above in the case the NAS 200 has received an e-mail containing a READ command and password for permitting access for the purpose of reading a designated file from a storage medium. This processing is carried out when, for example, an e-mail as shown in FIG. 19 has been received from an external terminal.

When the NAS initiates processing, the NAS extracts information 485c1 representing a file designated in the e-mail from the e-mail and reads out the designated file represented by this information 485c1 from the storage medium 242 (S422). Furthermore, in the case the designated file is not stored in the storage medium, a message to that effect may be returned to the external terminal in the form of an error. Next, origin data D1 of the e-mail containing a list of commands is read from the storage medium (S424). As shown in the reply mail of FIG. 20, for example, this origin data is in the form of information representing the NAS 200 that is inserted into the sender display column 486a (such as the NAS name and e-mail address), information inserted into the title column 486b for the purpose of indicating this to be a reply mail, and information representing a predetermined portion 486c1 of the contents column 486c. Moreover, information 486c3 representing the path and file name of the file read in S422 is added to the contents column 486c (S426). In addition, the file read in S422 is attached to the e-mail in the form of an attachment (S428). Furthermore, in the case of changing the password each time an e-mail is sent, a password 486c2 differing from the previous password is added to the contents column 486c (S430).

Figure 20:
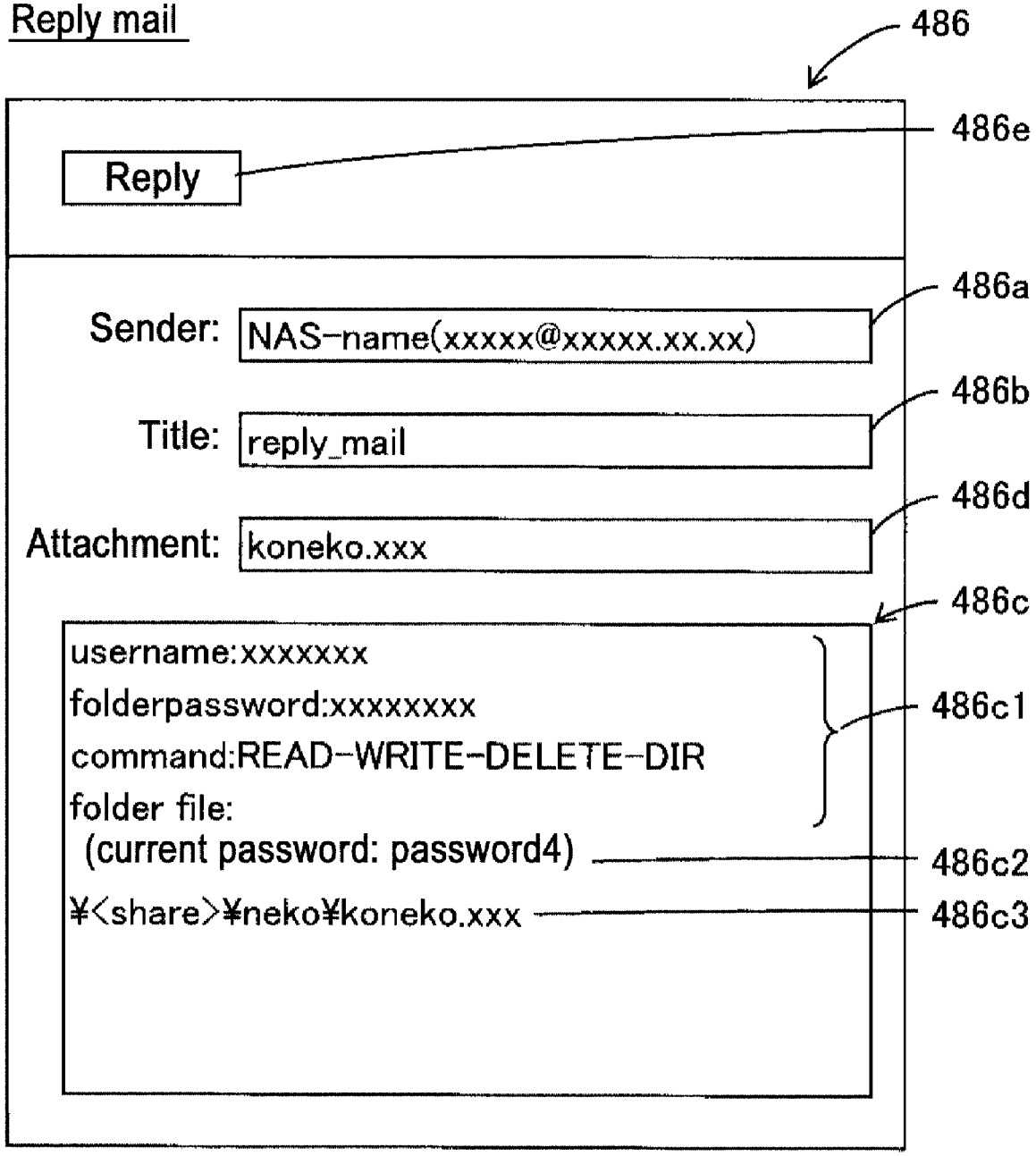
FIG. 20 is an exemplary illustration of a drawing showing a display of a reply mail in the case of having read out a file.

Since an e-mail for replying to a READ command is generated as a result of the above-mentioned processing, file readout processing is completed by sending this e-mail to an external terminal (S432). Whereupon, the reply e-mail display screen 486 shown in FIG. 20 is displayed on an external terminal such as the PC 400. Therefore, a user of an external terminal can use a file read from the storage medium of the NAS by opening an attached file displayed in the attachment column 486d or by saving in a prescribed location of the terminal.

Furthermore, a user can easily create an e-mail for the purpose of requesting access to the NAS by operating the reply button 486e. For example, as shown in FIG. 21, when a user enters an NAS name and password in the title column (487b), attaches a file in the attachment column (487d), deletes those commands other than a required command from the list of commands in the contents column (487c), enters required information after deleting unnecessary information below "folder file:" and then operates the send button (487e), an e-mail can be sent for the purpose of requesting access to the NAS.

Figure 12:
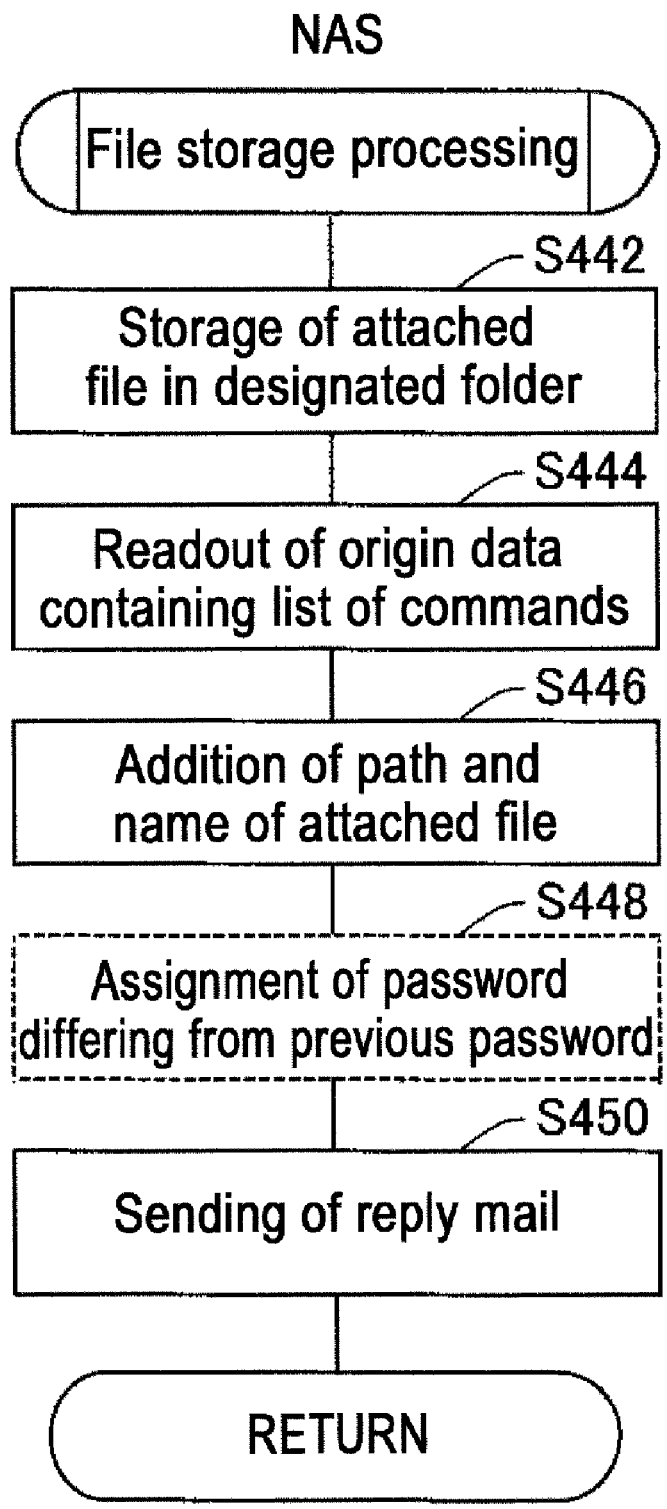
FIG. 12 is an exemplary illustration of a flow chart showing file storage processing carried out by a storage device.

FIG. 12 shows an example of file storage processing carried out in the S322 described above in the case the NAS 200 has received an e-mail containing a WRITE command and password for permitting access for the purpose of saving an attached file in a designated folder of a storage medium. This processing is carried out when, for example, an e-mail as shown in FIG. 21 has been received from an external terminal.

When the NAS initiates processing, the NAS extracts information 487c1 representing a file designated in the e-mail from the e-mail and saves the attached file in a designated folder (area) represented by this information 487c1 (S442). Furthermore, in the case the designated folder is not formed in the storage medium, a message to that effect may be returned to the external terminal in the form of an error, or the designated folder may be formed in the storage medium and the attached file may be saved in that folder. Next, origin data D1 of the e-mail containing a list of commands is read from the storage medium (S444). As shown in the reply mail of FIG. 22, for example, this origin data is in the form of information representing the NAS 200 that is inserted into the sender display column 488*a* (such as the NAS name and e-mail address), information inserted into the title column 488*b* for the purpose of indicating this to be a reply mail, and information representing a predetermined portion 488*c*1 of the contents column 488*c*. Moreover, information 488*c*3 representing the path and file name of the file saved in S442 is added to the contents column 488*c* (S446). Furthermore, in the case of changing the password each time an e-mail is sent, a password 488*c*2 differing from the previous password is added to the contents column 488*c* (S448).

Figure 22:
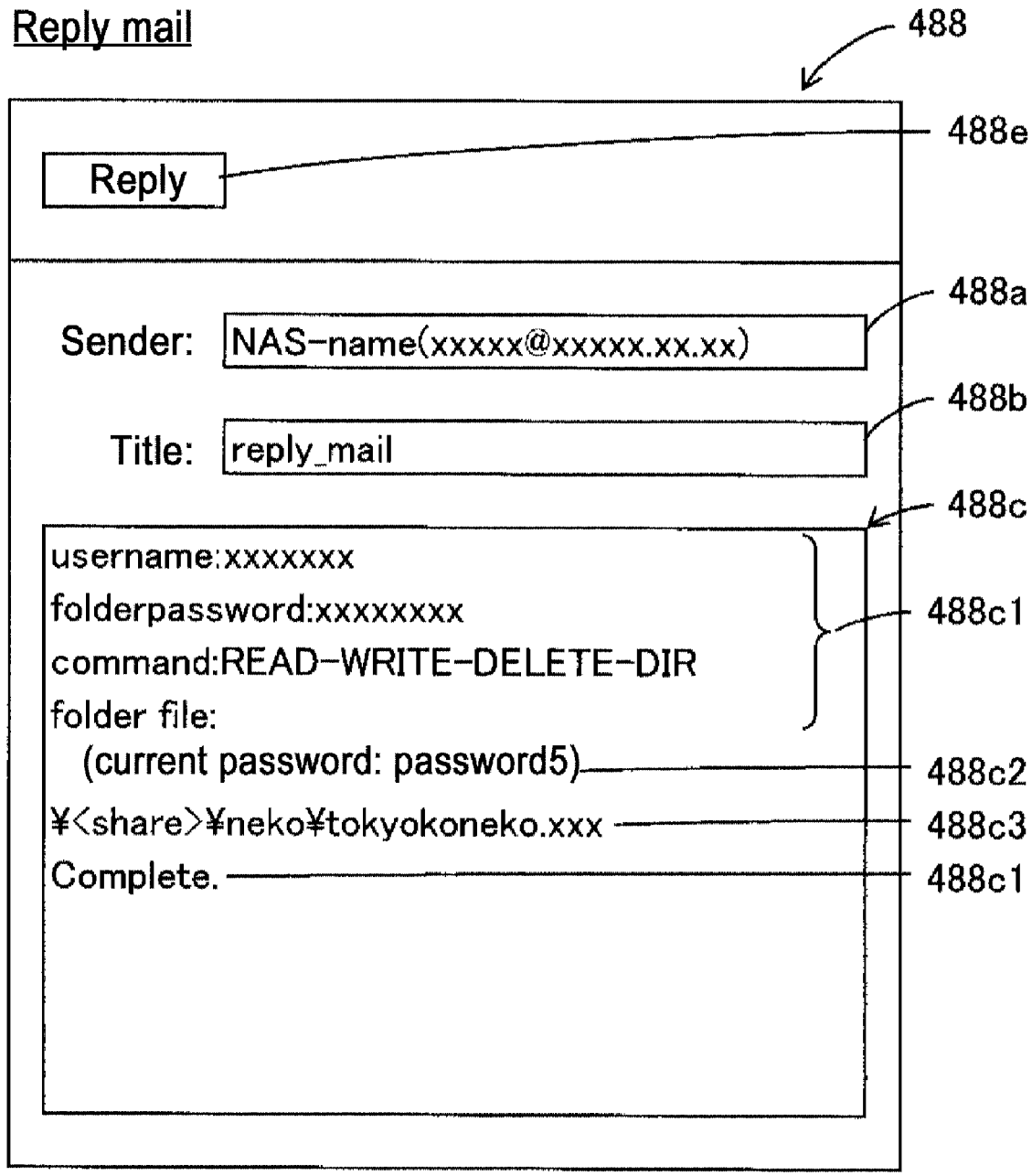
FIG. 22 is an exemplary illustration of a drawing showing a display of a reply mail in the case of having stored a file.

Since an e-mail for replying to a WRITE command is generated as a result of the above-mentioned processing, file storage processing is completed by sending this e-mail to an external terminal (S450). Whereupon, the reply e-mail display screen 488 shown in FIG. 22 is displayed on an external terminal such as the PC 400.

Furthermore, a user can easily create an e-mail for the purpose of requesting access to the NAS by operating the reply button 488*e*. For example, as shown in FIG. 23, when a user enters an NAS name and password in the title column (489*b*), deletes those commands other than a required command from the list of commands in the contents column (489*c*), enters required information after deleting unnecessary information below "folder file:" and then operates the send button (489*e*), an e-mail can be sent for the purpose of requesting access to the NAS.

Figure 13:
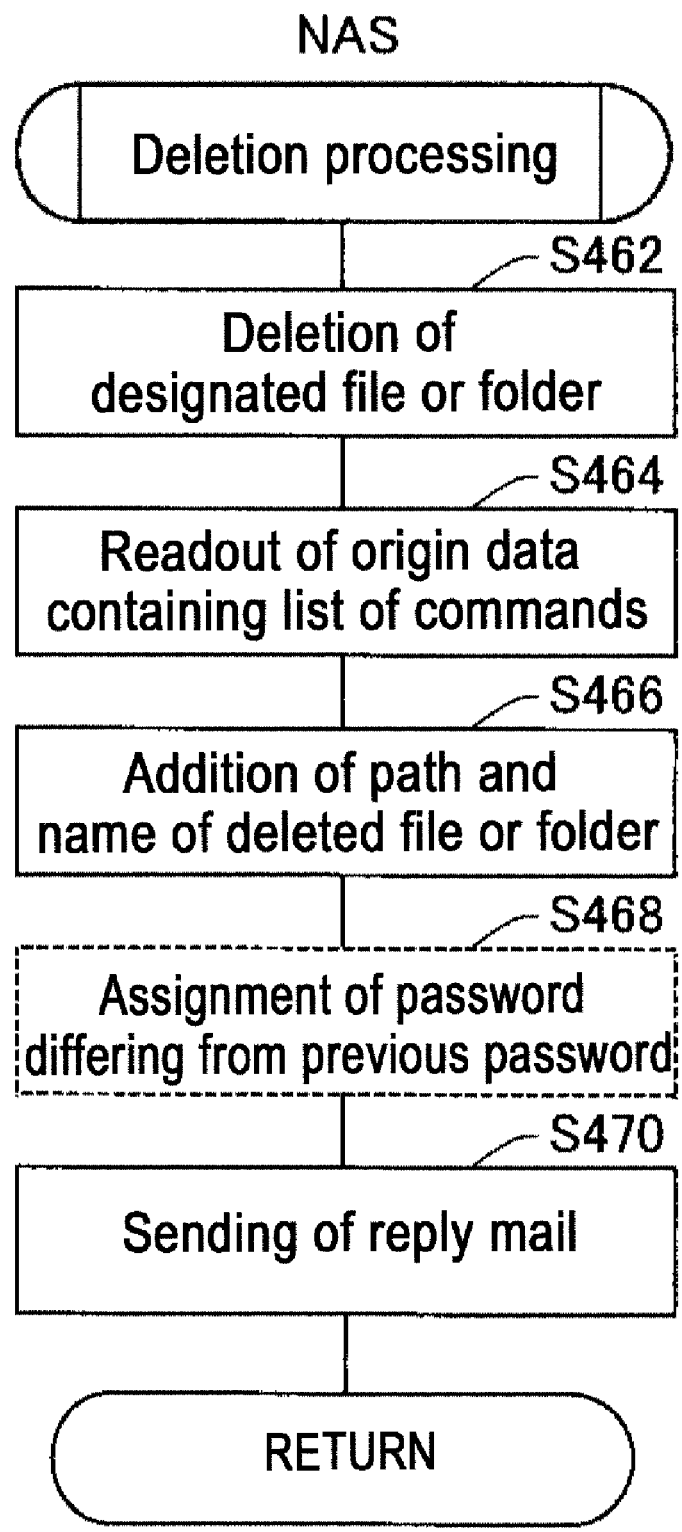
FIG. 13 is an exemplary illustration of a flow chart showing deletion processing carried out by a storage device.

FIG. 13 shows an example of deletion processing carried out in the S322 described above in the case the NAS 200 has received an e-mail containing a DELETE command and password for permitting access for the purpose of deleting a designated file or folder in the storage medium. This processing is carried out when, for example, an e-mail as shown in FIG. 23 has been received from an external terminal.

When the NAS initiates processing, the NAS extracts information 489*c*1 representing a file or folder designated in the e-mail from the e-mail and deletes the designated file or folder represented by this information 489*c*1 (S462). Furthermore, in the case the designated file or folder is not contained in the storage medium, a message to that effect may be returned to the external terminal in the form of an error. Next, origin data D1 of the e-mail containing a list of commands is read from the storage medium (S464). As shown in the reply mail of FIG. 24, for example, this origin data is in the form of information representing the NAS 200 that is inserted into the sender display column 490*a* (such as the NAS name and e-mail address), information inserted into the title column 490*b* for the purpose of indicating this to be a reply mail, and information representing a predetermined portion 490*c*1 of the contents column 490*c*. Moreover, information 490*c*3 representing the path and file name of the file or folder deleted in S462 is added to the contents column 490*c* (S466). Furthermore, in the case of changing the password each time an e-mail is sent, a password 490*c*2 differing from the previous password is added to the contents column 490*c* (S468).

Figure 24:
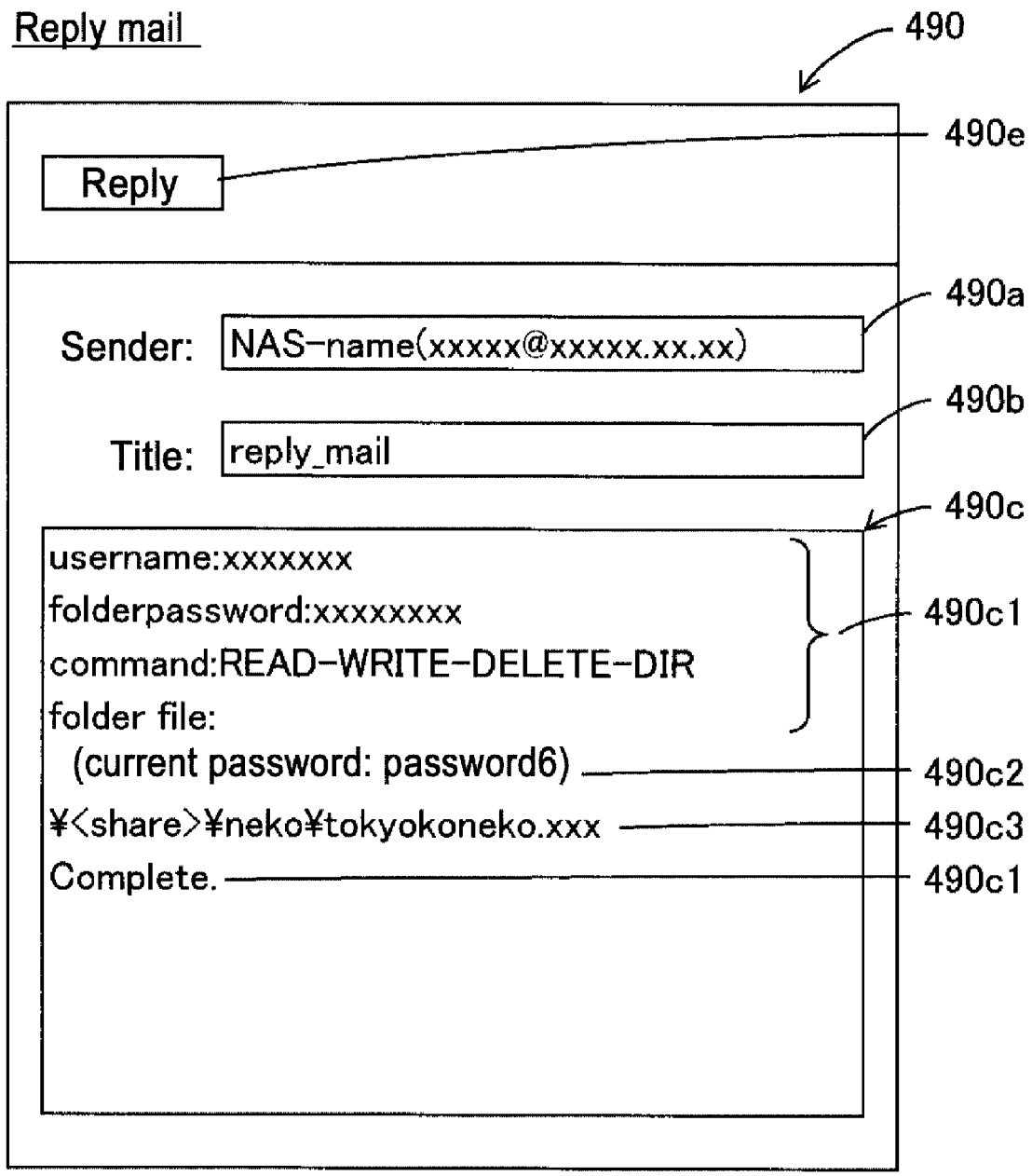
FIG. 24 is an exemplary illustration of a drawing showing a display of a reply mail in the case of having deleted a file or folder.

Since an e-mail for replying to a DELETE command is generated as a result of the above-mentioned processing, file deletion processing is completed by sending this e-mail to an external terminal (S470). Whereupon, the reply e-mail display screen 490 shown in FIG. 24 is displayed on an external terminal such as the PC 400.

Figure 25:
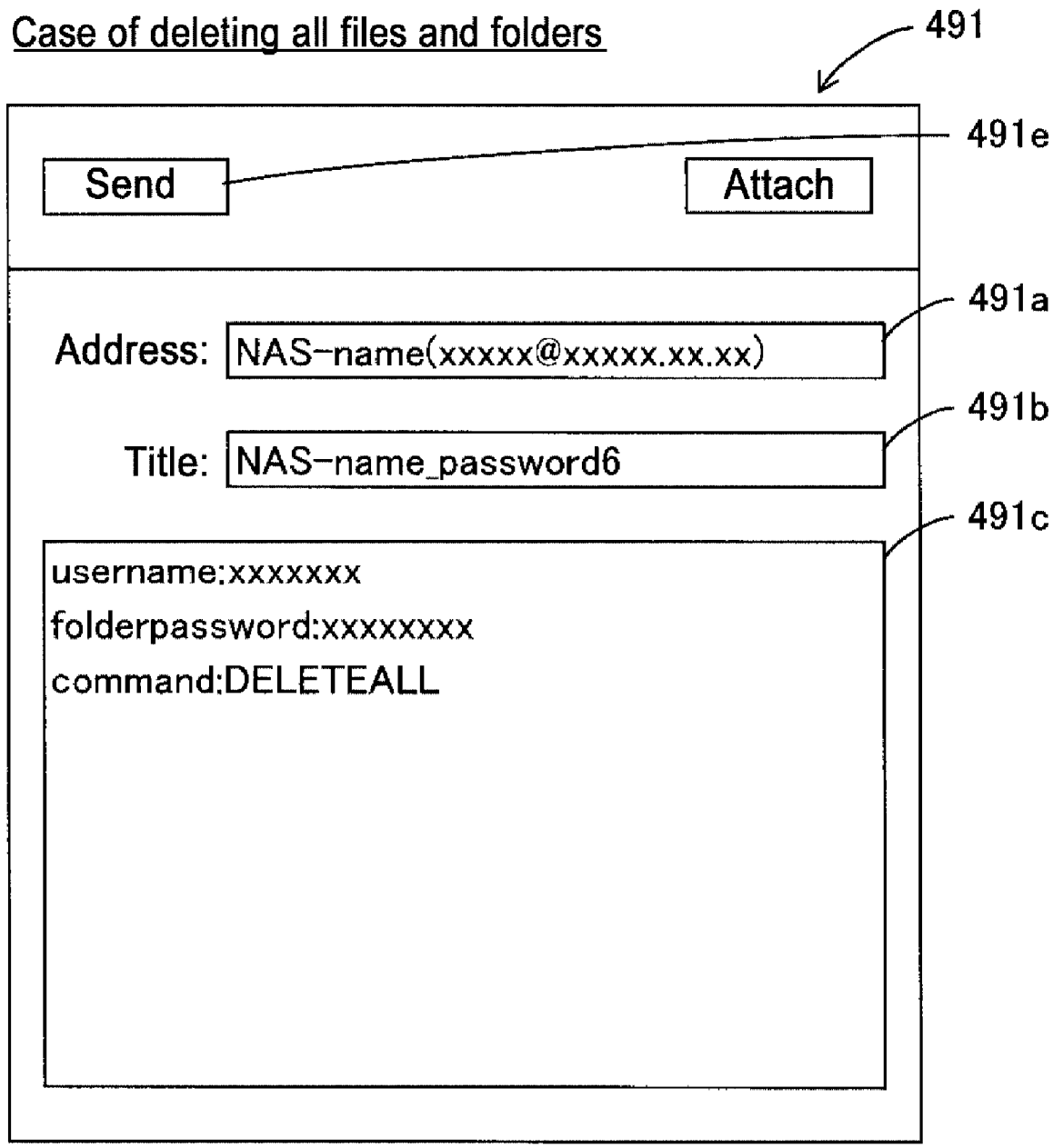

Furthermore, a user can easily create an e-mail for the purpose of requesting access to the NAS by operating the reply button 490*e*. For example, as shown in FIG. 25, when a user enters an NAS name and password in the title column (491*b*), deletes those commands other than a required command from the list of commands in the contents column (491*c*), deletes information below "folder file:" and then operates the send button (491*e*), an e-mail can be sent for the purpose of requesting access to the NAS.

Figure 14:
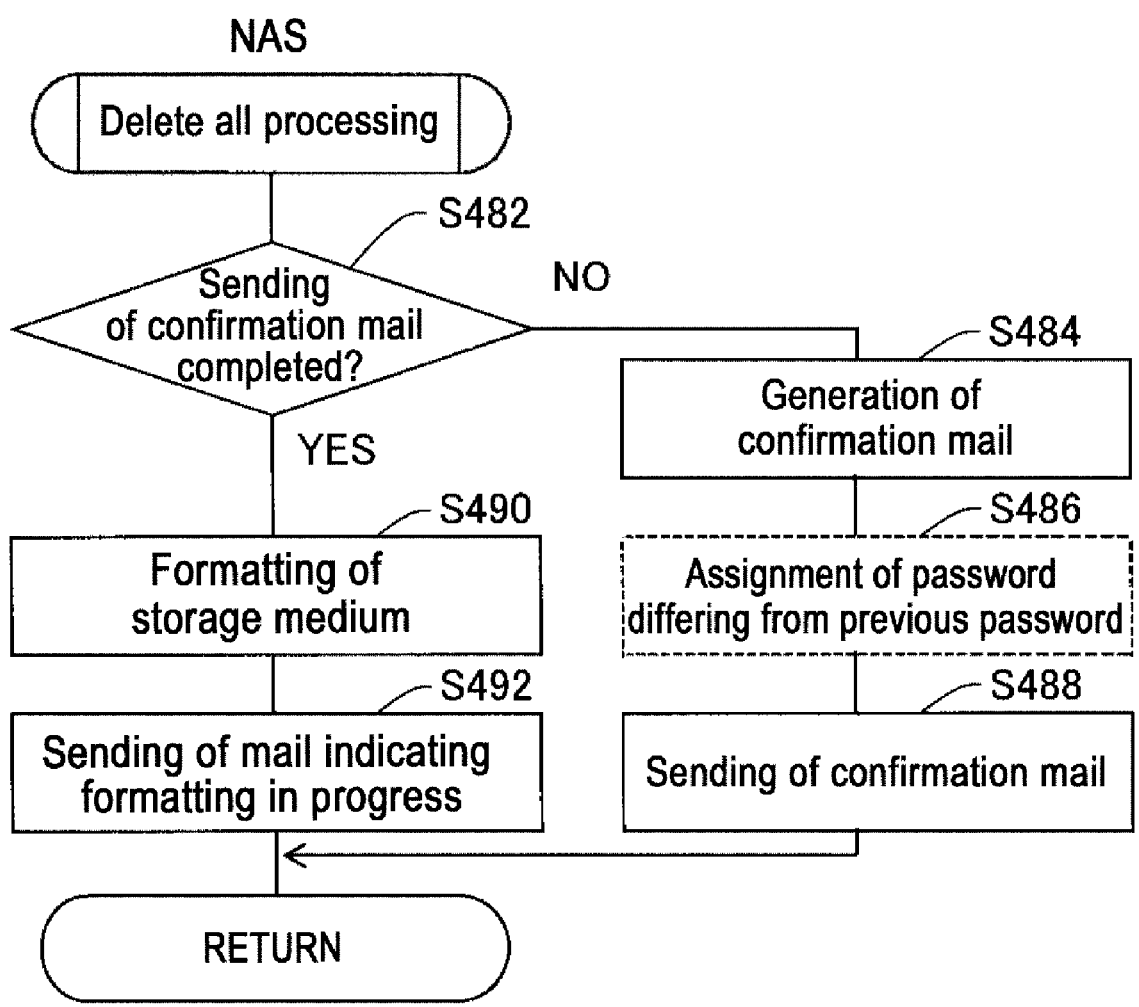
FIG. 14 is an exemplary illustration of a flow chart showing all deletion processing carried out by a storage device.

FIG. 14 shows an example of all deletion processing carried out in the S322 described above in the case the NAS 200 has received an e-mail containing a DELETEALL command and password for permitting access. This processing is carried out when, for example, an e-mail as shown in FIG. 25 has been received from an external terminal. This processing is carried out for the purpose of deleting all data on the storage medium of the NAS, and the NAS carries out processing for deleting all data from the storage medium in the case the NAS has sent a confirmation mail to an external terminal, and has received a reply mail for the purpose of deleting all data of the storage medium in response to this confirmation mail.

When the NAS initiates processing, the NAS judges whether or not an e-mail for the purpose of confirming deletion of all data on the storage medium in the form of a confirmation mail has already been sent to an external terminal (S482). In the case it has been judged that a confirmation mail has not yet been sent, a confirmation mail is generated addressed to the external terminal that received the e-mail containing the DELETEALL command (S484). Information requesting confirmation of formatting of the storage medium in the manner of "Are you sure?", for example, is contained in the contents column of the confirmation mail. Furthermore, in the case of changing the password each time an e-mail is sent, a password differing from the previous password is added to the contents column (S486). Delete all processing is then completed by sending the generated confirmation mail to the external terminal (S488).

Here, a user of the external terminal can create a reply mail in response to the confirmation mail in the form of an e-mail containing the DELETEALL command and a password for permitting access, and send that e-mail addressed to the NAS. Thus, when the NAS receives the reply mail containing the DELETEALL command, the NAS again carries out delete all processing in S322 described above. In this case, the condition of S482 is satisfied, the storage medium is formatted and all data on the storage medium is deleted (S490). In addition, delete all processing ends after sending a message to the external terminal to the effect that formatting of the storage medium is in progress (S492).

As has been explained above, when an external terminal connected to an external network accesses a storage medium of an NAS connected to an internal network, the target file to be accessed is attached to an e-mail, data communication of the e-mail is carried out between the external terminal and the NAS, and access to the storage medium from the external terminal is accepted. Whereupon, the e-mail to which is attached the target file to be accessed is delivered to an external terminal and the NAS by data communication via the external network and the internal network without having to specially set a network exchange or firewall provided between the external network and the internal network. As a result, in the case of an environment enabling sending and receiving of e-mails to and from a remote location through a mail file attachment function that allows data communication of e-mails to be carried out, required data can be sent and received between storage devices when necessary without being subjected to network exchange or firewall restrictions.

Thus, according to this storage system and storage device, along with the control method and control program thereof, a storage medium of a storage device can be easily accessed from an external terminal.

Furthermore, if the cell phone 600 is used for the external terminal, an e-mail attached with data of photographic images captured with the cell phone can be sent to a storage device in the home or office, an e-mail attached with a music file can be received from a storage device in the home when suddenly desiring to listen to music with a cell phone provided with a music playback function, or an e-mail attached with a file containing work-related data can be received from a storage device in the office in the case of suddenly needing work-related data when out of the office. Thus, this storage system can be configured using a cell phone as well, making it possible to provide a highly convenient storage system.

(3) Other Variations The present invention can also be applied without providing a firewall between the internal network and the external network as previously described.

The above-mentioned internal network may also be configured at least from an external-side internal network connected to an external network, and an internal-side internal network connected to the external-side internal network without being connected to the external network. In addition, the above-mentioned external network may also be configured at least from an internal-side external network connected to an internal network, and an external-side external network connected to the internal-side external network without being connected to the internal network. Naturally, the internal network and the external network may also have a structure consisting of three layers or more. In these cases as well, by attaching a target file for accessing between a storage device connected to the internal network and a terminal connected to the external network, the storage device is able to accept access to a storage medium from the terminal.

In the case of carrying out data communication of an e-mail between the storage device and the terminal, the e-mail may be sent to a receiving side after encoding on the sending side, after which the e-mail may be decoded on the receiving side. During encoding, data may be compressed or data may be made to change after encoding in response to a password for accepting access. In the case of carrying out data communication of an e-mail between the two sides after attaching a file, data communication may also be carried out by dividing data contained in the attached file into a prescribed data size. Whereupon, even in cases in which a mail server does not permit data communication of data of attached files beyond a prescribed data size, data communication of e-mails attached with files having a large data size can be carried out between both sides.

Since the previously described commands are merely examples of commands for accessing a storage medium of a storage device, commands for accessing the storage medium may also consist of, for example, a read command only, a write command only or a directory command, read command and write command only. The previously described delete all command may be substituted with a delete command that designates the uppermost folder (route directory) having a folder (directory) tree structure. The delete command may also be substituted with a write command that designates a file of 0 data size in which data is not contained.

In the flow charts described above, part of the order of each step can be interchanged. For example, in the folder structure readout processing of FIG. 10, S402 and S404 can be interchanged and S406 and S408 can be interchanged. This applies similarly to the processing of FIGS. 11 to 14.

Furthermore, the present invention is not limited to the embodiments and examples described above, but rather configurations resulting from mutually substituting, recombining or changing the configurations disclosed in the embodiments and examples, and configurations resulting from mutually substituting, recombining or changing the known art along with each of the configurations disclosed in the embodiments and examples described above, are also included therein.

Another aspect of the present invention provides a storage system having a storage device connected through an internal network with an external network and a terminal coupled with the external network,
wherein the storage device is provided with a storage medium for storing files, and an access unit for accepting access to the storage medium from a terminal by attaching a target file for accessing the storage medium to an e-mail and carrying out data communication of the e-mail with the terminal through the external network, and
the terminal accesses the storage medium of the storage device by attaching a target file for accessing the storage medium of the storage device to an e-mail and carrying out data communication of the e-mail with the storage device through the external network.

Another aspect of the present invention provides a computer-readable recording medium on which is recorded a control program of a storage device connected through an internal network with an external network, comprising:
causing a computer to realize a function for accepting access from a terminal coupled with the external network to a storage medium in which files are stored by attaching a target file for accessing the storage medium to an e-mail and carrying out data communication of the e-mail with the terminal.

When a terminal coupled with an external network accesses a storage medium of a storage device coupled with an internal network, a target file for accessing the storage medium is attached to an e-mail, data communication is carried out of the e-mail between the terminal and the storage device, and access to the storage device from the terminal is accepted.

The e-mail attached to the target file for accessing the storage medium is delivered to the terminal and the storage device by data communication via an external network and an internal network without specially setting a network exchange or firewall provided between the external network and the internal network. Thus, the storage medium of the storage device can be easily accessed from the external terminal.

According to the inventions, a storage medium of a storage device can be accessed from an external terminal without having to specially set a network exchange or firewall.

An optional aspect of the present invention provides the storage device wherein upon receiving from the terminal an e-mail for the purpose of requesting save of an attached file in a designated area of the storage medium, the access unit saves the attached file in the designated area of the storage medium.

In the invention, a file can be stored in a storage device from external terminals without having to specially set a network exchange.

Another optional aspect of the present invention provides the storage device wherein upon receiving from the terminal an e-mail for the purpose of requesting readout of a designated file from the storage medium, the access unit reads the designated file from the storage medium and sends the file to the terminal as an attachment to an e-mail.

In the invention, a file stored in a storage device can be read out from an external terminal without having to set special settings in a network exchange.

Another optional aspect of the present invention provides the storage device wherein upon receiving from the terminal an e-mail for the purpose of requesting initiation of access to the storage medium, the access unit sends an e-mail containing a list of commands for accessing the storage medium to the terminal, and upon receiving an e-mail containing a command contained in the list of commands from the terminal, the access unit carries out processing of the command contained in the e-mail on the storage medium.

In the invention, a user using an external terminal can execute access to a storage device by specifying a command from the terminal without having to remember a command for accessing the storage device. Thus, convenience when executing access to the storage device can be improved.

Another optional aspect of the present invention provides the storage device wherein the access unit sends an e-mail to the terminal containing therein a password differing from the password of the previous transmission each time an e-mail is sent, and only when an e-mail containing the password contained in the sent e-mail and the command is received from the terminal, the access unit carries out processing of the command contained in the received e-mail on the storage medium.

In the invention, since a password for permitting access to a storage device is changed each time an e-mail is sent, a function for defending against unauthorized access to the storage device can be improved.

Another optional aspect of the present invention provides the storage device wherein the access unit carries out processing for receiving an e-mail addressed to the storage device for each first time period, and upon receiving an e-mail for the purpose of requesting initiation of access from the terminal, the access unit carries out processing of the command contained in the e-mail from the terminal on the storage medium by carrying out processing for receiving an e-mail addressed to the storage medium for each second time period that is shorter than the first time period.

In the invention, since processing for reception of e-mails addressed to a storage device is carried out after waiting for a comparatively long period of time when not accessing the storage device from an external terminal, the storage device can be accessed from an external terminal without placing a large burden on a mail server.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. A storage device connected through an internal network with an external network, the storage device comprising:
    a storage medium for storing files; and
    an access unit that carries out data communication of an e-mail with an attached file for accessing the storage medium with a terminal that is coupled with the external network and accepts access to the storage medium from the terminal based on the e-mail, the e-mail including one of a first e-mail for a purpose of requesting initiation of access and a second e-mail for a purpose of requesting access;
wherein
    the access unit carries out processing for receiving the e-mail including one of the first e-mail and the second e-mail addressed to the storage device repeatedly at a first receiving interval; and
    upon receiving one of the first e-mail and the second e-mail from the terminal, the access unit carries out processing for receiving the e-mail including one of the first e-mail and the second e-mail addressed to the storage device repeatedly at a second receiving interval that is shorter than the first receiving interval and accepts access to the storage medium from the terminal.

2. The storage device according to claim 1, wherein upon receiving from the terminal the second e-mail for requesting save of an attached file in a designated area of the storage medium, the access unit saves the attached file in the designated area of the storage medium.

3. The storage device according to claim 1, wherein upon receiving from the terminal the second e-mail for requesting readout of a designated file from the storage medium, the access unit reads the designated file from the storage medium and sends the file to the terminal as an attachment to a reply mail for readout.

4. The storage device according to claim 1, wherein upon receiving from the terminal the first e-mail, the access unit sends a reply mail containing a list of commands for accessing the storage medium to the terminal, and upon receiving the second e-mail containing a command contained in the list of commands from the terminal, the access unit carries out processing of the command contained in the second e-mail on the storage medium.

5. The storage device according to claim 4, wherein the access unit sends a reply mail to the terminal containing therein a password differing from the password of the previous transmission each time a reply mail is sent, and only when the second e-mail containing the password contained in the sent reply mail and the command is received from the terminal, the access unit carries out processing of the command contained in the received second e-mail on the storage medium.

6. The storage device according to claim 1, wherein
    the storage medium saves and stores files in hierarchical folders; and
    the access unit carries out processing for receiving an e-mail addressed to the storage device repeatedly at a first receiving interval, upon receiving the first e-mail containing a password for permitting access from the terminal coupled with the external network, carries out processing for receiving an e-mail addressed to the storage device repeatedly at the second receiving interval that is shorter than the first receiving interval in addition to sending to the terminal a reply mail containing a list of access commands at least having a directory command for reading a folder structure of the storage medium, a read command for reading files from the storage medium, and a save command for saving files in the storage medium, upon receiving the second e-mail containing the directory command and the password for permitting access from the terminal, reads the folder structure from the storage medium and sends a reply mail containing information representing the folder structure to the terminal, upon receiving from the terminal the second e-mail containing the read command and the password for permitting access, for reading a designated file from the storage medium, reads the designated file from the storage medium and sends the file to the terminal as an attachment to a reply mail for readout, and upon receiving from the terminal the second e-mail containing the save command and the password for permitting access, for saving an attached file in a designated folder of the storage medium, saves the attached file in the designated folder of the storage medium.

7. A storage system, comprising:

a storage device connected through an internal network with an external network; and a terminal coupled with the external network;

the storage device has a storage medium for storing files;

the storage device has an access unit that carries out data communication of an e-mail with an attached file for accessing the storage medium with the terminal through the external network and accepts access to the storage medium from the terminal based on the e-mail, the e-mail including one of a first e-mail for a purpose of requesting initiation of access and a second e-mail for a purpose of requesting access;

the terminal carries out data communication of one of the first e-mail and the second e-mail attached a target file for accessing the storage with the storage device through the external network and accesses the storage medium of the storage device;

wherein the access unit carries out processing for receiving the e-mail including one of the first e-mail and the second e-mail addressed to the storage device repeatedly at a first receiving interval; and upon receiving one of the first e-mail and the second e-mail from the terminal, the access unit carries out processing for receiving the e-mail including one of the first e-mail and the second e-mail addressed to the storage device repeatedly at a second receiving interval that is shorter than the first receiving interval and accepts access to the storage medium from the terminal.

8. A control method of a storage device connected through an internal network with an external network, comprising:

carrying out processing with a computer for carrying out data communication of an e-mail with an attached file for accessing a storage medium of the storage device with a terminal that is coupled with the external network and accepting access to the storage medium from the terminal based on the e-mail, the e-mail including one of a first e-mail for a purpose of requesting initiation of access and a second e-mail for a purpose of requesting access;

carrying out processing for receiving the e-mail including one of the first e-mail and the second e-mail addressed to the storage device repeatedly at a first receiving interval; and carrying out processing for receiving the e-mail including one of the first e-mail and the second e-mail addressed to the storage device repeatedly at a second receiving interval that is shorter than the first receiving interval upon receiving one of the first e-mail and the second e-mail from the terminal to accept access to the storage medium from the terminal.

\* \* \* \* \*